United States Patent [19]
Griffin

[11] Patent Number: 4,636,974
[45] Date of Patent: Jan. 13, 1987

[54] METHOD AND APPARATUS FOR TRANSFERRING DATA BETWEEN OPERATIONALLY-JUXTAPOSED MEMORIES AND KNOWLEDGE-RETRIEVING SYSTEMS UTILIZING SAME

[75] Inventor: Arthur F. Griffin, Woodland Hills, Calif.

[73] Assignee: Hughes Aircraft Company, Los Angeles, Calif.

[21] Appl. No.: 538,853

[22] Filed: Oct. 4, 1983

[51] Int. Cl.[4] ............................................. G06F 12/00
[52] U.S. Cl. ................................................... 364/900
[58] Field of Search ... 364/200 MS File, 900 MS File

[56] References Cited

U.S. PATENT DOCUMENTS
4,464,732  8/1984  Clark .................................... 364/900

OTHER PUBLICATIONS
H. O. Leilich, G. Stiege, H. C. Zeidler, "A Search Processor for Data Base Management Systems", IEEE (New York), 1978, pp. 280-287.
M. A. Bonuccelli, E. Lodi, F. Luccio, P. Maestrini and L. Pagli "A VLSI Tree Machine for Relational Data Bases", IEEE (Los Angeles) 1983, pp. 67-73.

*Primary Examiner*—Raulfe B. Zache
*Attorney, Agent, or Firm*—Leonard A. Alkov; A. W. Karambelas

[57] ABSTRACT

The present invention's fundamental technique for transferring data between two operationally-juxtaposed memories basically entails thress steps: First, a sequential accessing of specified portions of the memories; second, a pair-wise comparison of the accessed data items; and third, a "diagonal" exchange between the subject memories of certain ones of the data items.

The technique thus begins with the sequential accessing, within each of the subject memories, of each of a plurality of memory portions. This sequential accessing thereby establishes within each memory a presently-accessed portion and a plurality of subsequently-accessed portions. The pair-wise comparison of the data items from the respective presently-accessed portions is performed next. Upon the occurrence of a match condition between the paired items, the presently-accessed item from a given one of the memories is then "diagonally" exchanged with the item from a subsequently-accessed portion in the other memory.

In a more-specific embodiment of the invention, a self-associating information-retrieval capability may be realized by utilizing the fundamental data-transfer technique as the basic mechanism for exchanging information between adjacent levels of a branched-hierarchy memory array.

25 Claims, 29 Drawing Figures

Fig. 1a.
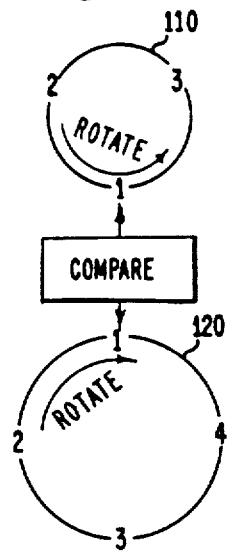
Fig. 1b.
| PORTION NO. | |
|---|---|
| TOP LOOP | LOWER LOOP |
| 1 | 1 |
| 2 | 2 |
| 3 | 3 |
|   | 4 |
| 1 | 1 |
| 2 | 2 |
| 3 | 3 |
|   | 4 |
| 1 | 1 |
| 2 | 2 |
| 3 | 3 |
|   | 4 |
| 1 | 1 |
| 2 | 2 |
| 3 | 3 |
|   | 4 |
1 REV (top loop) / 1 REV (lower loop)
Fig. 2a.
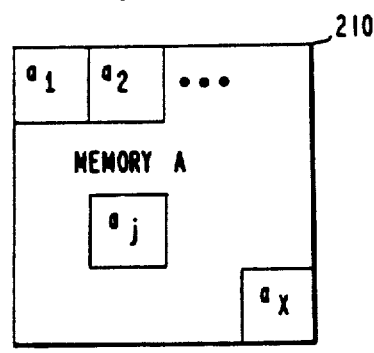
Fig. 2b.
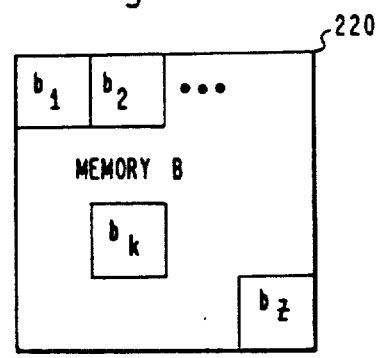

METHOD AND APPARATUS FOR TRANSFERRING DATA BETWEEN OPERATIONALLY-JUXTAPOSED MEMORIES AND KNOWLEDGE-RETRIEVING SYSTEMS UTILIZING SAME

BACKGROUND OF THE INVENTION

1. Field of the Invention

The invention relates in general to computer-memory systems and in particular to data-transfer operations and data-transfer architectures for such systems. The invention has special relevance for both information retrieval and the expert-systems branch of artificial intelligence.

It is to be noted, however, that while the subject invention will be described with reference to particularized end uses, the invention is not limited to such uses. Those having ordinary skill in the art and access to the teachings of this specification wil recognize additional utilizations within the invention's scope.

2. Description of the Prior Art

A. Basic Associational Requirement

In certain classes of data-accessing systems, a central functional requirement for operational effectiveness is the ability to establish associations between related data items. Consider, for example, the field of information retrieval. Given an inputted information query whose ultimate objective is the retrieval of an appropriate stored item of information, the system in effect must be able to establish an association between the query and the stored item in order for that item to be selected as a retrieval output. Similarly, an expert system in the field of artificial intelligence, when presented with a given decisional problem, must likewise be able to establish an association between the elements of the problem and the appropriate ones of its stored decision rules in order for the problem to be dealt with in a correct manner.

A central deficiency of the prior-art systems has been their net operational inefficiency in the formation of such associations. Among the factors which have been commonly symptomatic of this associational inefficiency are first, the necessity for a high level of skill on the part of the system operator; second, the difficult and labor-intensive nature of the design task required to produce such systems; and third, the inordinate complexity of the systems themselves. The causal factors for these disadvantageous consequences will be examined following the next-presented overview of the basic nature of some of the principal prior-art data-accessing systems.

B. Basic Operational Situations

1. Information Retrieval

The fundamental task of a typical information-retrieval system is to access within memory an appropriate portion of a stored textual data base. In a first type of retrieval system, the data base, usually in the form of ordinary sequential-language text, is accompanied by an inverted file comprising an alphabetical listing of the more-meaningful items within the original text. Included along with a given item in the alphabetized list is a software "pointer" identifying that item's location in the original text.

An information query into such a system commonly takes the form of a set of key words connected by logical operators. For example, given a stored text whose contents was the topic "Weather" and given that the retrieval task was the accessing of those portions of the text dealing with the use of barometric pressure in predicting the likelihood of rain, a typical query might include the key words "barometric pressure," and "probability of precipitation," while the logical operator might be an "AND." The query would then appear as "barometric pressure AND probability of precipitation." The system would process this query by examining the contents of its alphabetized listing for the presence of the key words and then moving to the associated pointer-indicated portions of the original text where the original language would then be examined for the conjunctive presence of both sets of key words.

In a second typical type of retrieval system, the search for correspondences between the query and the data base is performed by hardware mechanisms instead of the described inverted software file. The usual hardware implementation of this nature processes the information query simply by performing a sequential, item-by-item check of the entire contents of the original stored text for the concurrence of the subject query elements.

In contrast with these first two types of systems which ultimately require that a given set of words in the textual data be "anticipated" by a query encompassing basically those very same words, a third type of prior-art retrieval system supplementally employs a form of thesaurus. Textual retrieval from a system of this nature occurs when words in the data base match either the query words themselves or their thesarus-stored synonyms. While in associational terms the first two system types thus depend on identicalities between the query and the data base, the thesaurus supplies a measure of less-exact, secondary-associational capability.

2. Artificial Intelligence

A basic task in the field of artificial intelligence is the searching of those representations of human knowledge known as semantic networks. These networks typically take the form of an interconnected array of nodes. The nodes represent individual items of information, while the interconnections represent the relationships between these information items. In the specialized situation of what is known as an expert system whose ultimate functional task is the independent management of an operational problem such as the automatic diagnosis of malfunctions in an electronic system, the basic nodal items of information would be the elemental decision rules needed for an appropriate diagnosis of a given operational difficulty. A system of this nature thus more-specifically operates by searching its semantic network for the appropriate decision rule needed for the resolution of the subject external problem.

Such systems have typically been implemented through some combination of software and hardware techniques. The basic software approach has been to create an extensive file whose individual data items are the nodal elements of semantic information. Included in the stored file along with the basic information items are software pointers referencing, and thus establishing the necessary interconnections with, the appropriate related nodal elements. Alternatively, hardware mechanizations for the nodal network may employ hardware processing elements as the nodes, with the relations between nodes being established by means of physically-wired interconnections between the processing elements. From the standpoint of overall network architecture, the nodes and interconnections have typically been configured so that the resulting composite array takes the form of either a branched hierarchy or a rectangular grid. A search of such networks commonly takes the form of an "interrogation" which propagates in parallel throughout the interconnected nodal array in an attempt to locate the appropriate stored decision rule. With a branched hierarchy, the propagation is "binary" in that there are typically two relationally-interconnective alternatives flowing from informational decisions made at any given node. A four-way propagation is analogously possible in response to the decisions made at the nodes of a typical grid-configured network.

C. Consequential Difficulties

1. Information-Retrieval Systems

With reference to the initially-presented comments concerning the central functional necessity of being able to establish associations between related data items, it may be observed that the typically-configured prior information-retrieval systems possess only the most-elementary types of associational capabilities of their own. These capabilities are effectively limited to simply the detection of exact correspondences between the inputted query elements and the stored textual data base. The presentation of a query which is highly anticipatory of the data-base contents is thus crucial to retrieval effectiveness.

A consequential major disadvantage of the prior systems is that the formulation of appropriately-anticipatory queries of this nature is a task requiring an often-considerable degree of background knowledge and innate skill. The systems are thus largely dependent upon the inputs of a highly-skilled user whose knowledgeable initial insights effectively serve as intermediate associations between a motivating informational need and the minimal, exact-detection capabilities of the typical retrieval system. It is thus apparent that the prior systems are more-appropriately characterizable primarily as user-associated systems in which the operator must be relied upon to effectively supply needed associations.

Another difficulty with the prior systems is that certain aspects of their makeup often require labor-intensive efforts during system establishment. For example, even though the above-discussed secondary-associational capability of a supplemental thesarus can enable the operator-skill requirements to be relaxed somewhat, the generation of such a thesarus is a time-consuming task ultimately requiring hand-coded associations. Systems of this nature are thus supplementally characterizable as designer-associated by virtue of synonymically-anticipated associations supplied on a pre-use basis.

The problem of output interpretation is yet another deficiency of the prior systems which makes them still-further dependent upon the user's skill level. The central difficulty here is that the typical system's output, in those cases where the precise informaiton desired has not been retrieved initially, does not itself effectively provide meaningful suggestions as to alternative avenues of query. Knowledgeable insights are typically again required in both analyzing what output is available and then synthesizing further queries. It may additionally be noted that this output problem is typically a compounding of the skill-dependent query-formulation problem in that overly-simplistic queries often give rise to inordinate amounts of output information, while overly-simplistic queries produce output which is uninformatively insufficient.

A final noteworthy problem concerns the often-impracticable operational complexity of the systems themselves. For example, the alphabetized inverted file is operationally cumbersome to merely maintain and even more cumbersome to update when additional entries must be inserted in conjunction with augmentations of the textual data base. It is furthermore apparent that the more extensive the data base, the greater the resulting complexity of the overall multi-file system. This previously-unavoidable complexity has inherently carried the potential of precluding the application of existing, automated-retrieval techniques to truly large-scale information-retrieval problems.

2. Expert Systems

Although the designer-associated nature of the typical expert system lessens the degree to which reliance must be placed on intelligent direction by a human operator, it is apparent that the design task itself is one of considerable formidability. A semantic network is an artificial construct whose nature and characteristics must be analyzed in advance and then tediously mechanized in order to achieve system operationality. It is conjunctively apparent that the greater the complexity of the operational problem to which it is desired to apply the capabilities of the expert system, the greater the complexity of the resulting system itself. Often inherently associated with an increase in complexity is an increase in inefficiency, as for example the commonly-inadequate operational speed of serially-processing computers. Complex inefficiency of this nature again often operates prospectively to preclude the construction of expert systems for real-world tasks to which such systems are otherwise theoretically applicable.

It may also be noted that an equally-complex aspect of the prior systems has been the nature of the network-alteration task required when operational modifications to a given system become desired. Such modifications are typically accomplished only by means of a tedious reworking of the overall nodal array. Extensive reprogramming and even intricate physical alterations are commonly-unavoidable aspects of such reworking.

D. Fundamental Unsatisfied Need

The shortcomings of the prior art have given rise to a basic need for a data-accessing system which would have a readily-mechanized self-associational capability with a significantly-reduced dependency on externally-supplied associations, and which would consequentially provide high net-operational efficiency while requiring neither highly-skilled users, nor labor-intensive design efforts nor an inordinate degree of intrinsic system complexity.

SUMMARY OF THE INVENTION

The shortcomings of the prior art are overcome and the previously-unresolved needs are satisfied by the present invention which generally provides a fundamental technique and associated apparatus for transferring data between two operationally-juxtaposed memories. The technique basically entails three steps: First, a sequential accessing of specified portions of the memories; second, a pair-wise comparison of the accessed data items; and third, a "diagonal" exchange, between the subject memories, of certain ones of the data items.

The technique thus begins with the sequential accessing, within each of the subject memories, of each of a plurality of memory portions. This sequential accessing thereby establishes within each memory a presently-accessed portion and a plurality of subsequently-accessed portions. The pair-wise comparison of the data items from the respective presently-accessed portions is performed next. Upon the occurrence of a match condition between the paired items, the presently-accessed item from a given one of the memories is then "diagonally" exchanged with the item from a subsequently-accessed portion in the other memory.

In a more-specific embodiment of the invention, a self-associating information-retrieval capability may be realized by utilizing the fundamental information-transfer technique as the basic mechanism for exchanging data between the levels of a branched-hierarchy memory array.

BRIEF DESCRIPTION OF THE DRAWINGS

Advantages and aims of the present invention will become apparent from a study of the following specifiation, especially when considered in conjunction with the accompanying drawings, in which:

FIG. 1(a) shows a schematic circulatory representation of the sequential accessing and pair-wise comparison between two memories in accordance with certain aspects of the present invention;

FIG. 1(b) illustrates the manner in which four revolutions of the upper memory in FIG. 1(a) and three revolutions of the associated lower memory are together required to effectuate a combinatorial pair-wise comparison of each of the designated elements in the upper memory with each of the designated elements in the lower memory;

FIGS. 2(a) and 2(b) schematically illustrate a more-general situation in which successive elements of functionally-juxtaposed memories are accessed for pair-wise-comparison purposes in accordance with various aspects of the present invention;

Figure 6A:
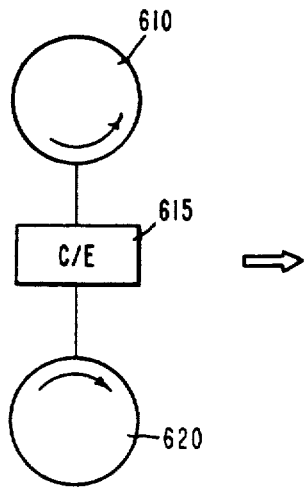
FIG. 6(a) illustrates a functionally-referenced form of a pai-red memory cluster which may be utilized in the practice of the present invention, while FIG. 6(b) schematically represents the corresponding hardware-referenced form of the paired cluster.
Figure 7A:
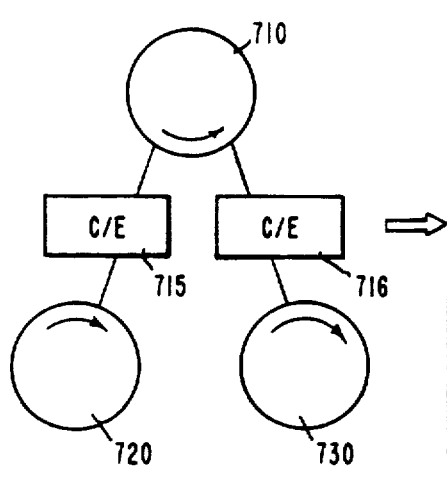
Figure 8:
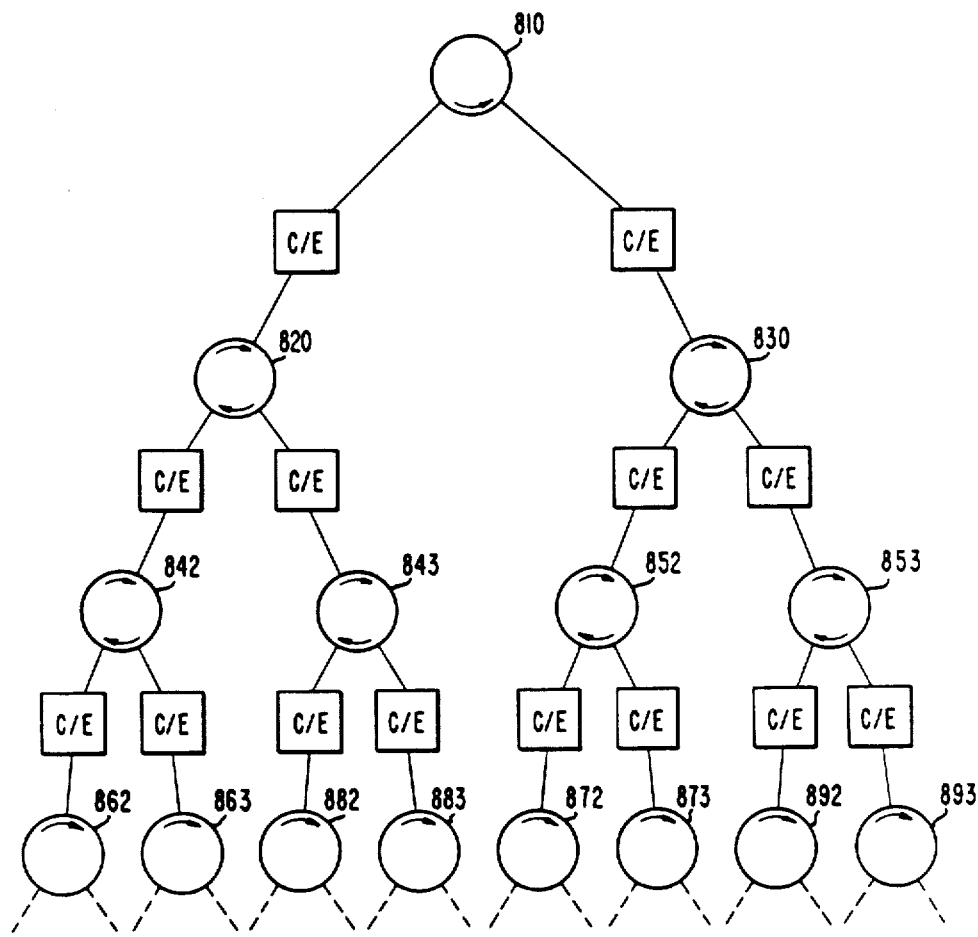
Figure 9:
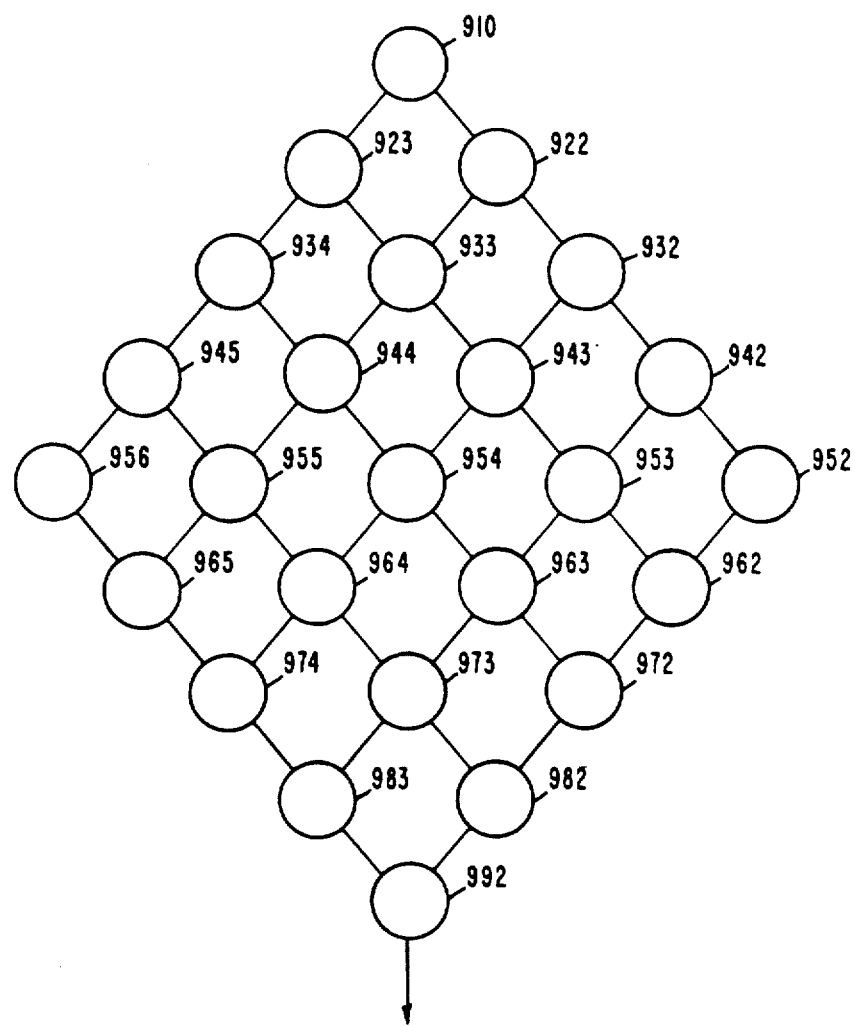
Figure 10:
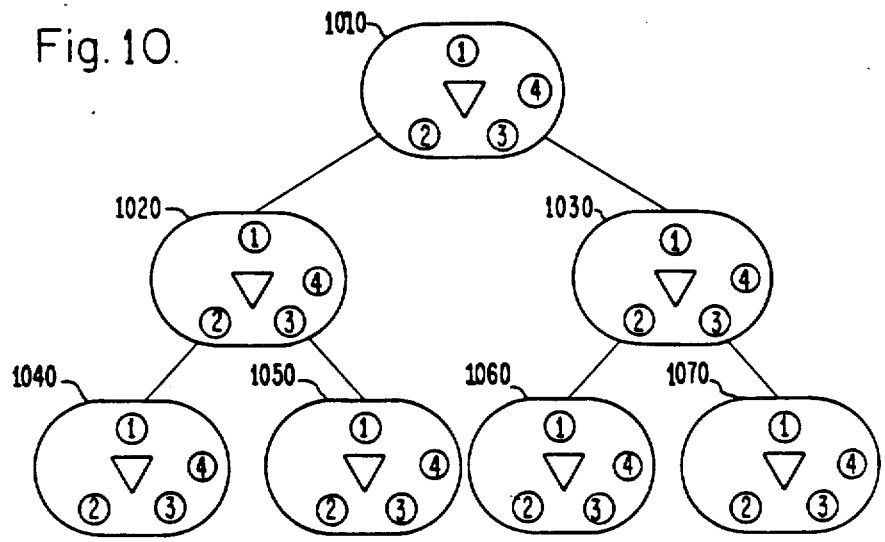
Figure 12:
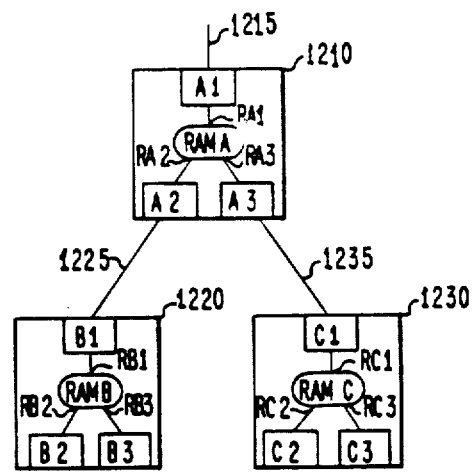
Figure 13:
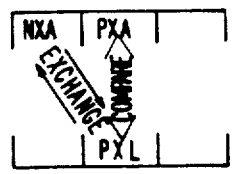
Figure 11:
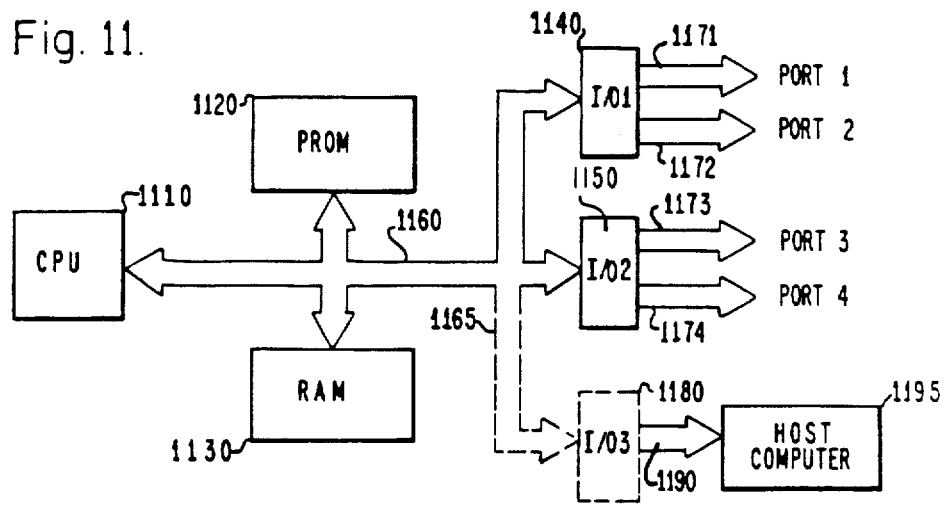
Figure 14:
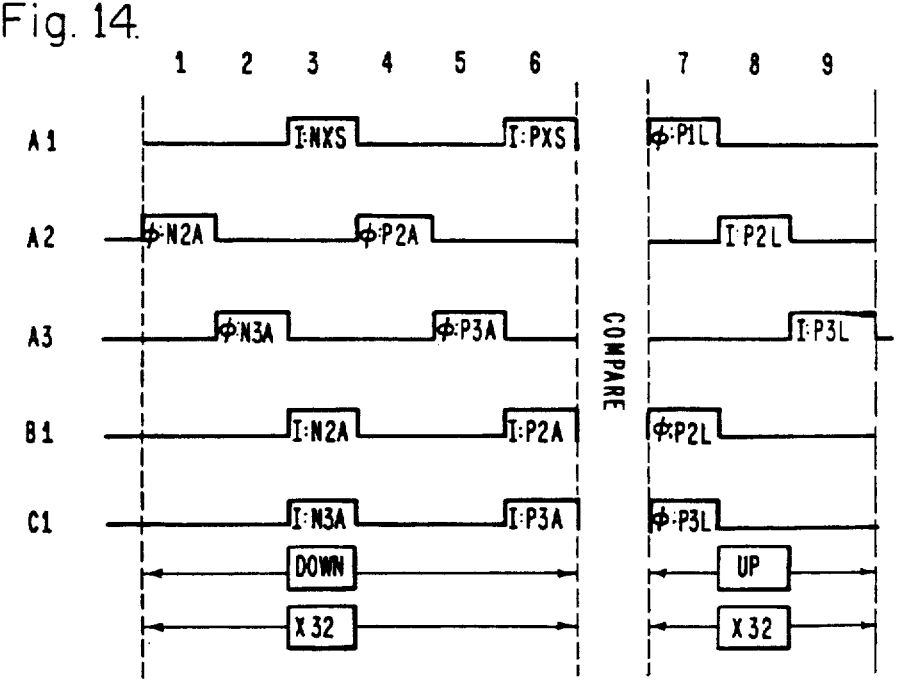
Figure 15:
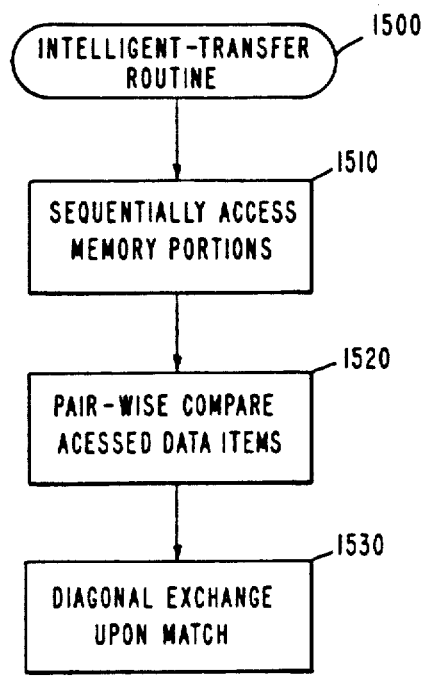
Figure 16:
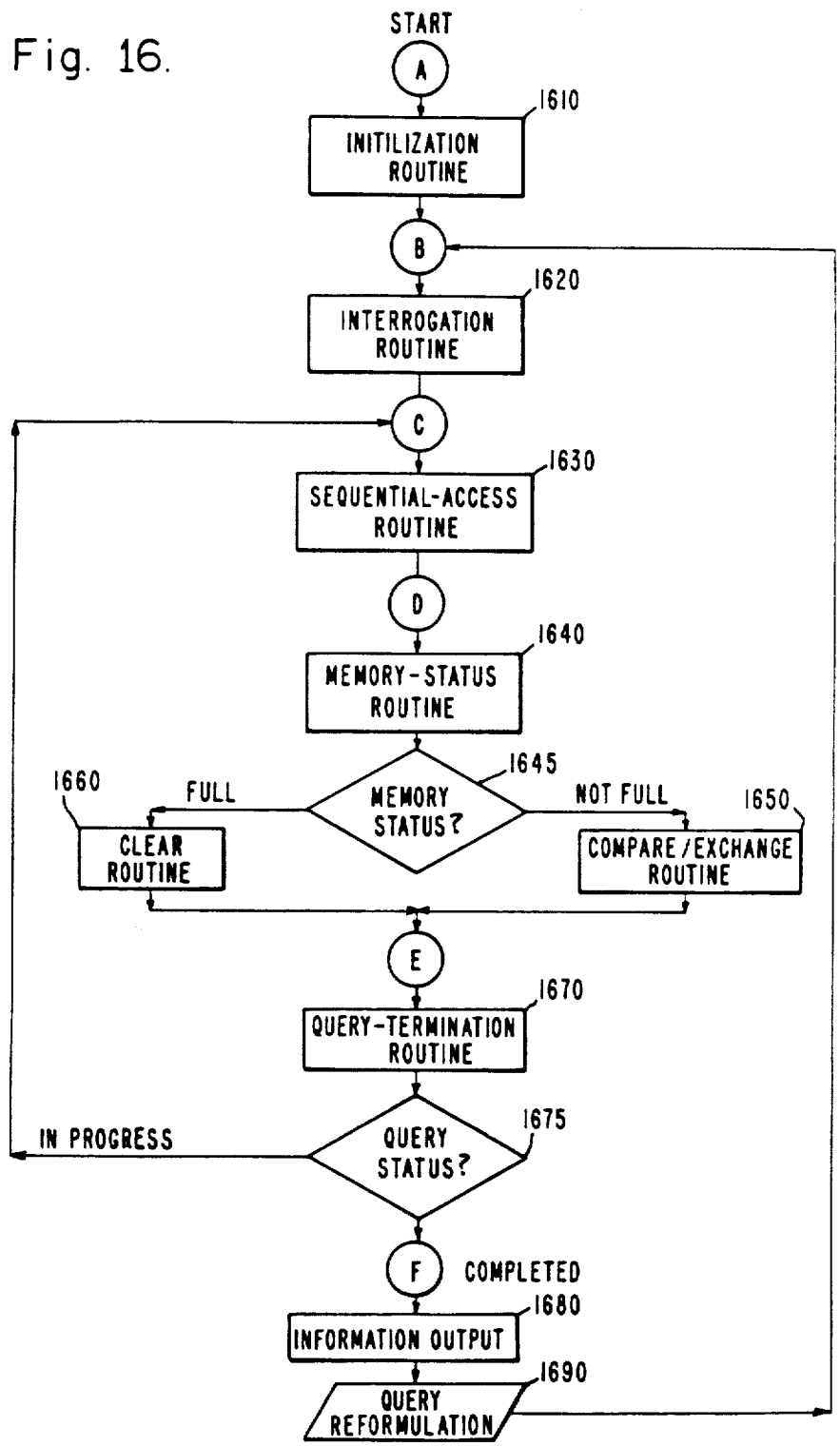
Figure 17:
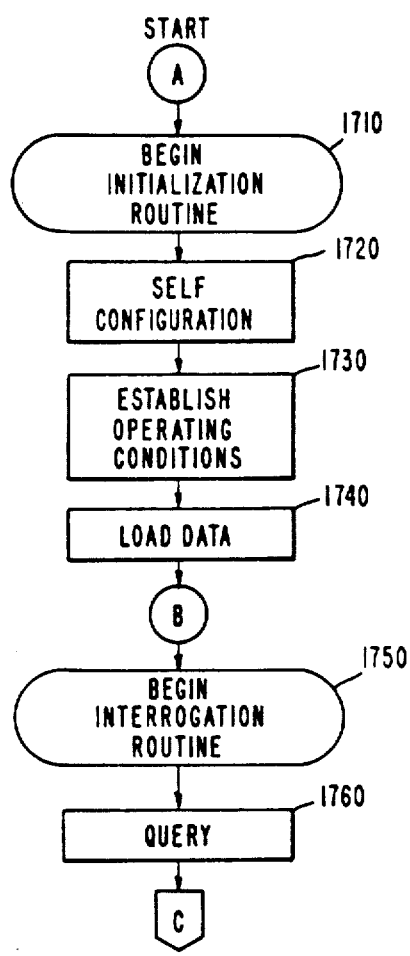
Figure 18:
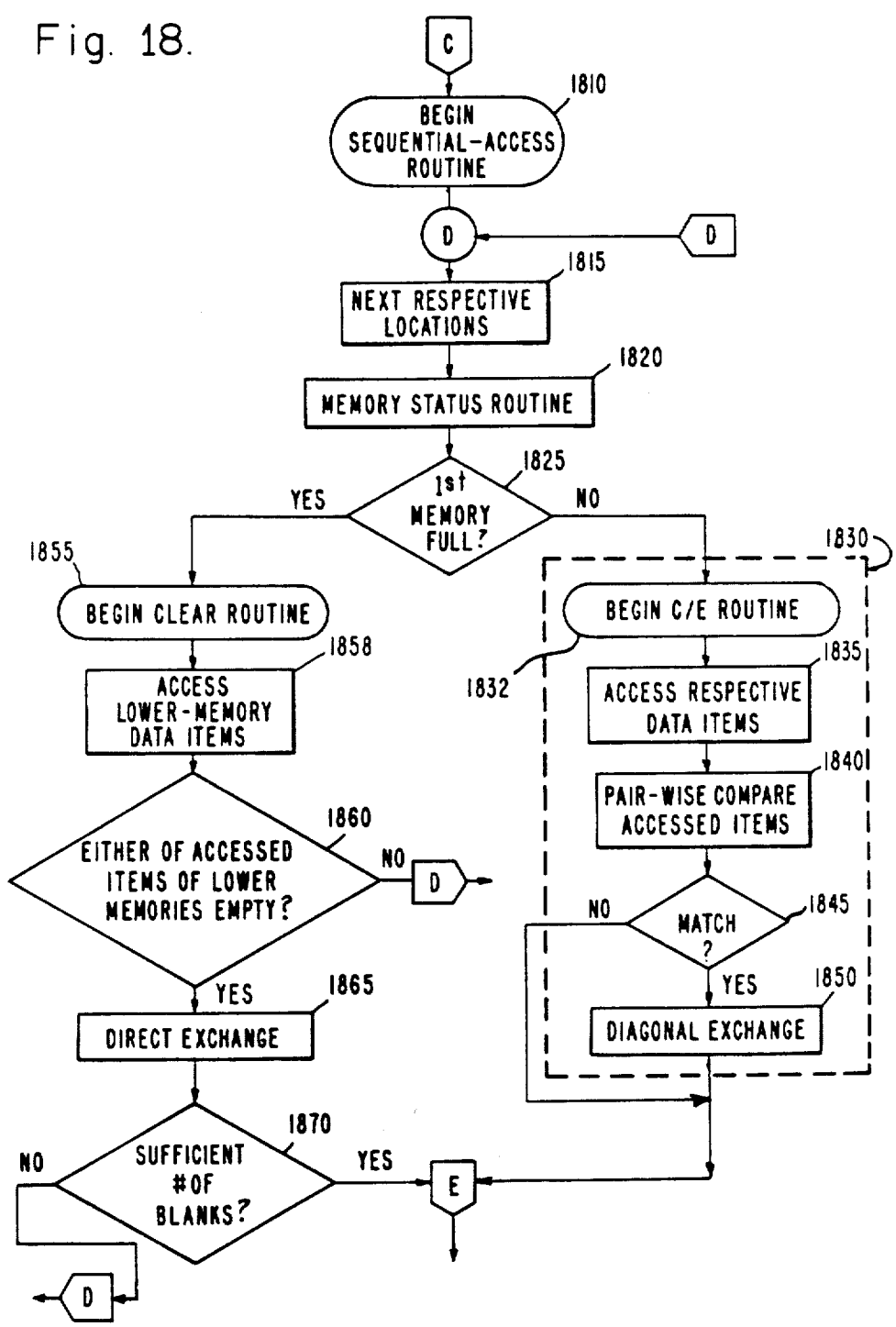
Figure 19:
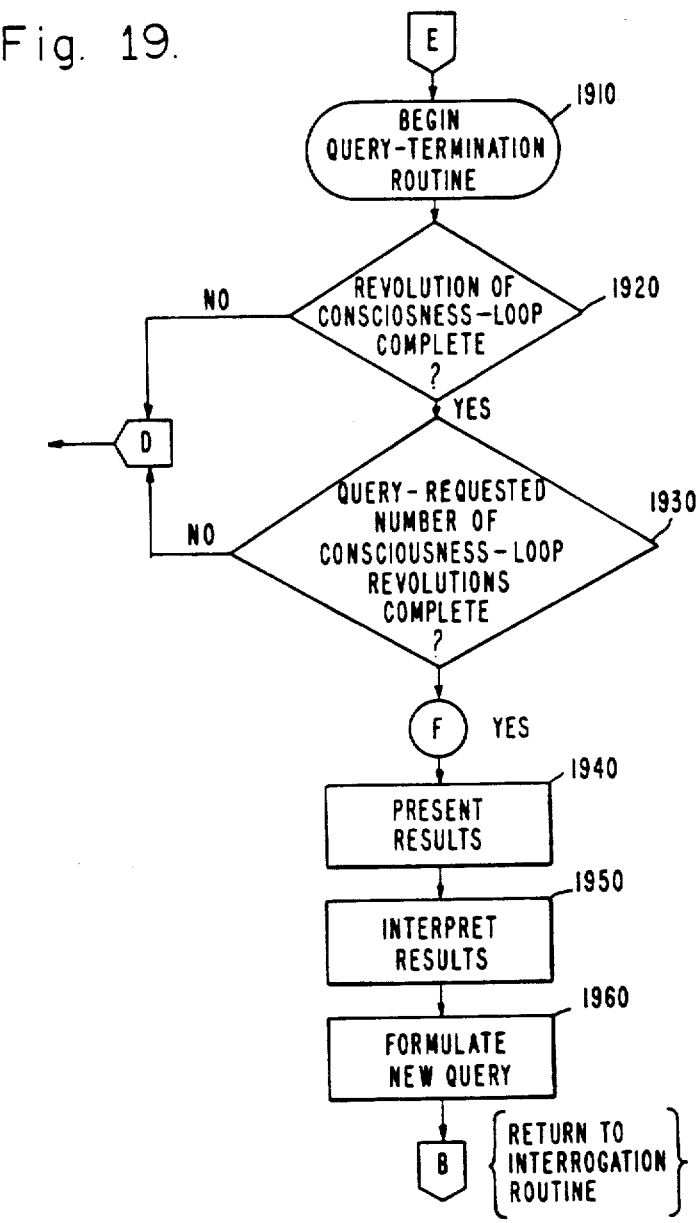
Figure 20:
Figure 21:
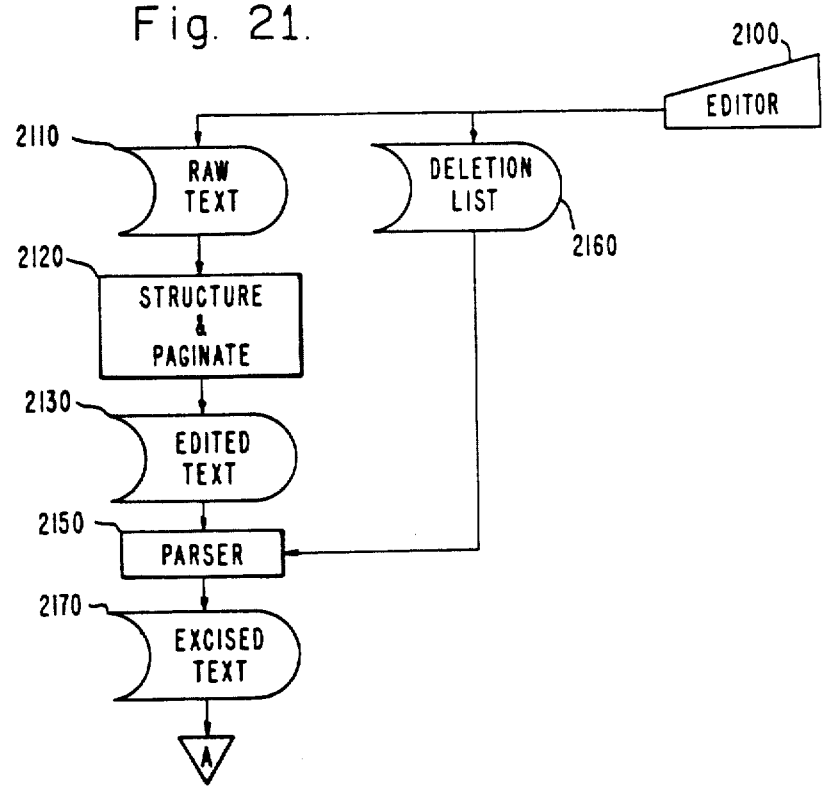
Figure 23:
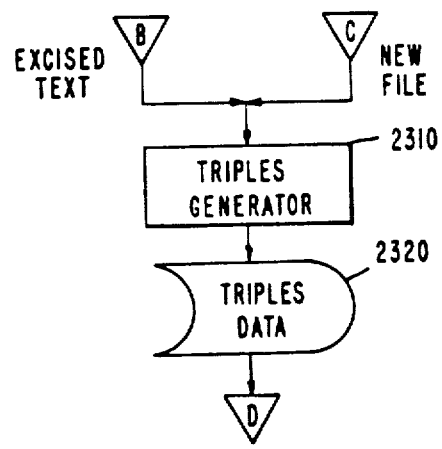
Figure 22:
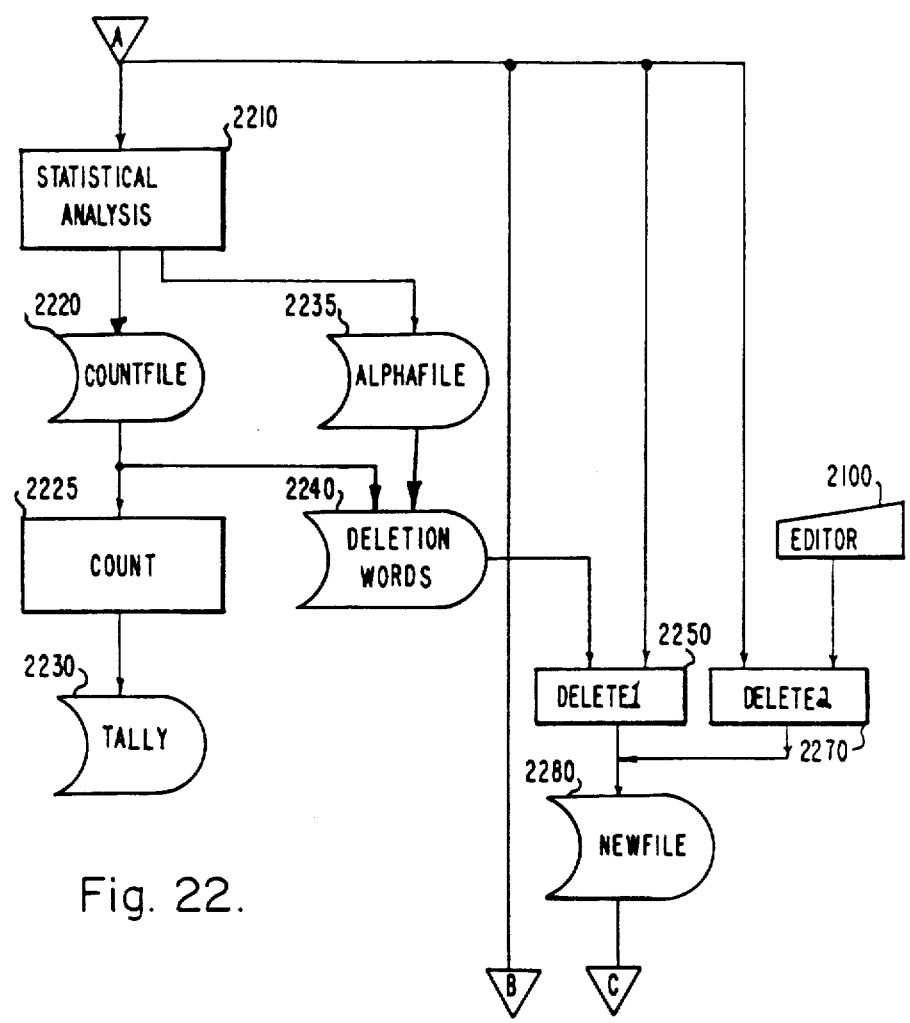

By analogy with FIGS. 6(a) and 6(b), FIGS. 7(a) and 7(b) respectively represent the functionally-referenced and hardware-referenced forms of a triangulated memory cluster which may be employed for the practice of the present invention;

As an advantageous specific mechanization for certain practical operational situations in which the invention finds advantageous utility, FIG. 8 schematically illustrates a composite, branched-hierarchy array repetitively composed of triangulated-cluster building blocks such as the one shown in FIG. 7(a);

FIG. 9 is a diamond-shaped lattice composed of an appropriate combination of a plurality of the paired and triangulated-cluster building blocks of respective FIGS. 6(a) and 7(a), this lattice having advantageous properties for certain practical applications of the present invention;

FIG. 10 schematically presents the higher levels of a branched hierarchy realized by means of single-board-computer processing modules;

FIG. 11 schematically represents a basic block diagram of one such single-board-computer module;

FIG. 12 schematically illustrates certain component and functional aspects of the inter-module data communications employed in an example realization of a triangulated memory cluster utilized in an implementation of the present invention;

FIG. 13 schematically represents a reiteration of basic considerations entailed in the compare-and-diagonal-exchange operation between functionally-juxtaposed memories, this time in the context of the memories illustrated in FIG. 12;

As an important aspect of an example local-synchronization protocol between the triangulated memories of the example realization presented in FIG. 12, FIG. 14 shows an example synchronization sequence for effectuating a multiple-cycle transfer of required data items between the subject memories;

FIG. 15 represents a basic operational routine for effectuating the present invention's intelligent transfer of associated data items between functionally-juxtaposed memories;

FIG. 16 presents in overview form a firmware-inclusive flowchart showing the basic operational routines utilized in an example mechanization of the present invention in the context of information-retrieval;

The flowchart sequence presented in FIGS. 17, 18 and 19 is a detailed expansion of the FIG.-16 flowchart;

FIG. 20 schematically presents a three-element, "data-triple" form of the subject data items, a form of this nature being conveniently employed when practicing the present invention in an information-retrieval context;

FIGS. 21, 22, and 23 set forth an example flowchart for a computer-analysis routine which may be utilized to derive, from a textual data base with respect to which information retrieval capability is desired, data-triples of the form shown in FIG. 20.

DETAILED DESCRIPTION OF THE INVENTION

I. Invention Fundamentals

A. Basic Data-Exchange Operation

As noted previously, the invention provides a fundamental technique and associated apparatus for exchanging data between two memories, each having a plurality of individually-accessible memory portions. Between such memories, the inventive exchange process involves three basic steps: First, in each of the memories, a sequential access is made of each of a predetermined plurality of the individual memory portions. This sequential accessing thereby establishes in each memory a presently-accessed portion and a plurality of subsequently-accessed portions. With respect to the data items stored at each given accessed portion, the second step of the exchange procedure provides that there is to be performed a pair-wise comparison between the presently-accessed data item from the first memory and the corresponding item from the second memory. The third part of the process provides that upon detection of a match condition between any given pair of compared data items, there is to be performed a diagonal exchange operation in which the data item from the presently-accessed portion of the second memory is exchanged with the data item from a predetermined one of the subsequently-accessed portions in the first memory.

It may be noted for the sake of terminology that a composite memory which encompasses at least one pair of memories interacting in accordance with the subject fundamental exchange technique may be denominated as Associate Loop Memory.

B. Operational Details

1. Sequential Accessing a. Designated Series of Memory Portions

With respect to the usual type of data-storage memory possessing a given totality of available memory portions, the sequential-accessing phase of the invention may generally involve a pre-operational designation of some serial plurality of the available portions whose contents are to be utilized for data of interest. The required accessing is then accomplished by sequencing through the individual memory portions of the designated series.

An understanding of such series-designation may be facilitated with reference to FIG. 1(a). The figure represents an elementary operational situation in which "circulating" loops 110 and 120 schematically represent a subject pair of operatively-associated memories. The designated series for the upper loop consists of the illustrated three memory portions, while four such portions have effectively been designated for the lower loop. By means of the indicated "rotations," the successive members of each of the respective memory-portion series are sequentially accessed, with the data items stored at each of the individual portions then being pair-wise presented for comparison with a given one of the data items from the designated series of the other memory.

b. Combinatorial Pairing

For many operational situations of interest it becomes convenient to specify that the respective sequential accessings be coordinated so as to effectuate a combinatorial pairing. In a pairing of this nature, each memory portion of the designated series of each of the subject memories is accessed for pairing with each member of the corresponding series from the other of the memories. A straightforward means for achieving such pairing is to configure the memories so that (1) the number of memory portions in the respective series are not multiples of each other (or more-precisely, so that the numbers are relatively prime), and (2) the respective series are iteratively accessed on a cyclical basis.

In the example situation of FIG. 1(a) where there are three designated portions in the upper memory and four such portions in the lower memory, it can be seen in conjunction with FIG. 1(b) that following four cycles of the upper loop and three cycles of the lower loop, each of the designated portions of the upper loop will have been accessed for pairing with each of the designated portions of the lower loop.

c. Alternative Realizations

A number of conventional memories may be employed for actual implementations of this phase of the present invention. A first type of embodiment might thus feature ordinary "square-array" memory devices such as random access memories (RAMs). Units 210 and 220 in FIG. 2 schematically represent memories of this nature. For the sake of facilitating subsequently-discussed aspects of the invention, units 210 and 220 are respectively designated "Memory A" and "Memory B." Of the portions available within these memories, the illustrated series of portions $a_1, a_2, \ldots a_J \ldots a_X$ and $b_1, b_2, \ldots b_K \ldots b_Z$ are indicative of a typical series designated for sequential access. The often-desired combinatorial pairing could be effectuated by making X and Z relatively prime and then iteratively accessing the respective series on a cyclical basis.

A second type of embodiment might entail memories which are inherently sequentially-accessed. Devices of this nature include bubble memories and memories utilizing charge-coupled-device technology. A conventional rotating disk is also a medium which is inherently sequentially-accessed. However, if two of the invention's operationally-juxtaposed memories were to be implemented by means of different tracks on a single disk, then an appropriate variable inter-track offset mechanism would ordinarily be required in order for combinatorial pairing to be accomplished. Because as commonly configured a disk utilizes a single read/write arm for track access, only those memory portions aligned along a common disk radius can be accessed concurrently. The absence of a differential delay between memory-portion access and data-item pairing would effectively limit the pairing operation to only those memory portions which are commonly aligned. A variable time delay between the accessing and pairing is thus needed to insure that each given portion on one of the tracks is paired with each given portion on the other track, including those other-track portions which are not concurrently accessed.

2. Pair-Wise Comparison a. Generalized Data Items

Figure 3A:
FIGS. 3(a) and 3(b) illustrate example 2-element versions of the general compound data items which are advantageously utilized in various applications of the present invention.
Figure 3B:

The data items stored for inventive processing may take on a variety of specific forms. These forms will typically be dependent upon the particularized requirements of a given operational situation. For a number of specialized end uses, such as information retrieval and expert systems, it becomes convenient to stipulate that the individual items possess a composite form entailing a plurality of data elements. A data item of this nature could then in general be described as an N-tuple having a predeterminable number N of component elements. The example multiple-component data items of FIGS. 3(a) and 3(b) are thus seen to each possess two elements, O(a) and V(a) and O(b) and V(b).

It may be noted that it will often be convenient to allow a degree of non-uniformity in the number of component elements possessed by the different data items. For example, the data item in memory portion $a_2$ of Memory A of FIG. 2 may contain an N-tuple of the N elements $n_1, n_2, \ldots n_N$, while memory portion $a_J$ may contain an R-tuple of a different number R of component elements $r_1, r_2, \ldots r_R$. It will also be parenthetically apparent, however, that a generalized, muliple-element situation described in terms of N-tuples and R-tuples is reducible to a uniform one simply by stipulating that N=R.

It is also to be noted that in this context of mulitple-element data items it becomes possible to clarify the meaning of the previously-utilized term "memory portion." This term is to be regarded as referring to a cluster of a number of memory locations sufficient to store all elements of the subject data items. Where such items are expected to be non-uniform, the per-cluster allocation of locations is thus to be sufficient to accommodate those data items having the greatest expected number of individual elements. For a number of situations of interest, however, it becomes advantageous to employ data items which are uniform and which possess only two component elements.

b. Combinatorial Comparison

The pair-wise comparison phase of the invention will be relatively straightforward in the elementary situations where the given stored data items are uniform and of unitary elemental composition. However, for those situations where the individual data items conveniently take the multiple-element form described above, it becomes convenient to specify that the comparison process also be implemented according to combinatorial principles. Thus, where a presently-accessed data item from a given first memory takes the form of an N-tuple composed of N data elements, and where a presently-accessed data item from a given second memory comprises an R-tuple of R data elements, the combinatorial form of the comparison operation will involve pair-wise comparing each of the N data elements from the first data item with each of the R data elements from the second data item. In this combinatorial situation, a match between the members of any one of these combinatorial pairs will be taken as representing a match condition between the subject composite data items.

It will be convenient to stipulate that the individual data items be uniform both within memories and between memories and possess only two component elements. A typical one of such uniform, bi-element data items from the first "A" memory could thus take the form presented in FIG. 3(a), while the corresponding bi-element, uniform data item from the second "B" memory would take the form schematically presented in FIG. 3(b). For reasons which will be more-fully discussed in conjunction with the specific operational application of an information retrieval system, the first and second elements of such items are respectively designated the "Object" and the "Value."

Figure 4:
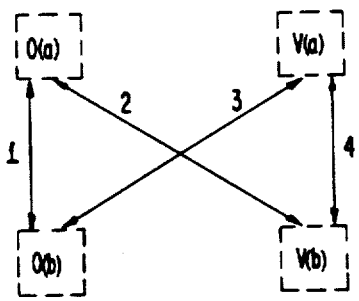
FIG. 4 illustrates an example combinatorial pair-wise comparison operation between representative two-element data items in connection with which a match in any one of the four combinatorial pairings is regarded as a match between the basic item "a" and item "b"

The elementary two-element data items of FIGS. 3(a) and 3(b) are indicative of the uniform data items respectively accessed from a given subject pair of subject associated memories. For items of this nature, the resulting combinatorial comparison operation can be schematically represented by the relationships presented in FIG. 4. In accordance with the requirement that each element of the respective data items be pair-wise compared with each element of each of the data items from the other of the sequentially-accessed memories, O(a) is shown by means of arrow 1 as being compared with O(b) and by means of arrow 2 as being compared with V(b). Similarly, V(a) is shown by means of arrow 3 as being compared with O(b) and is also shown by means of arrow 4 as being compared with V(b). Because the indicated pairings are naturally bi-directional, they inherently satisfy the complementary combinatorial requirement that each of the elements O(b) and V(b) be compared with each of the elements of the other data item. Combinatorial comparison is thus effectuated.

A match in any one of the indicated four pairings would be regarded as a match of the overall "A" data item with the overall "B" data item. The extension to the generalized case of an N-tuple from a given first memory and R-tuple from an associated second memory would be straightforward.

3. Diagonal Exchanging

Figure 5A:
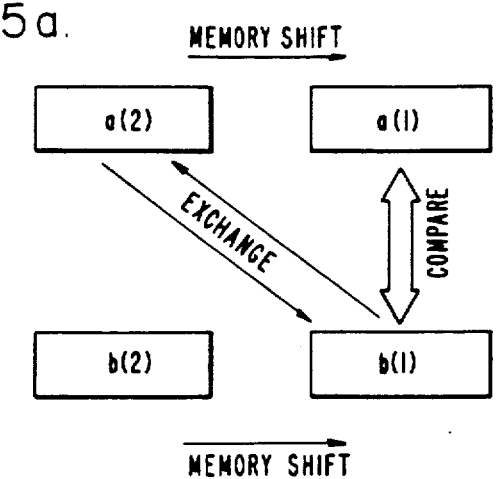
FIGS. 5(a) and 5(b) illustrate important elements of the compare-and-exchange operation performed with respect to sequentially-accessed data items in functionally-juxtaposed memories in accordance with a central aspect of the present invention.

The invention's diagonal-exchange phase will now be discussed. This phase, executed upon the detection of a match condition between two given presently-accessed data items, was initially described in the general terms of transferring the presently-compared data item from one of the subject memories to a predetermined one of the subsequently-accessed portions of the other memory. This description will now be particularized with respect to an often-advantageous operational context in which the subsequently-accessed portion to which a matched data item is diagonally exchanged is that portion which is otherwise the next to be accessed immediately following the completion of the inventive processing with respect to presently-accessed data items. FIG. 5 is illustrative of a particularized context of this nature.

a(1) and b(1) of FIG. 5(a) represent presently-accessed portions of respective first and second associated memories, such as, for example, Memories "A" and "B" of FIG. 2. a(2) and b(2) similarly represent the next-subsequently-accessed portions in these memories. The indicated memory shift from left to right provides a convenient framework for a discussion of the sequential accessing, even though, as will be apparent from previously-presented sections of the specification, no actual physical motion of the memories is required.

Following the performance of the indicated comparison between the data-item contents of the presently-accessed a(1) and b(1), and upon a determination that the compared items match, the also-indicated diagonal exchange is executed. In the illustrated form of the exchange, the data item from the presently-accessed position b(1) in the bottom loop is transferred into that poriton of the uppper memory which is the next to be compared. The as-yet uncompared data item in that next portion a(2) is simultaneously transferred to the lower-memory portion at which the now-completed comparison has just taken place. For convenience in the discussion which follows, the exhanged data items from b(1) and a(2) will be identified according to their pre-exchange memory-portion locations.

Figure 5B:
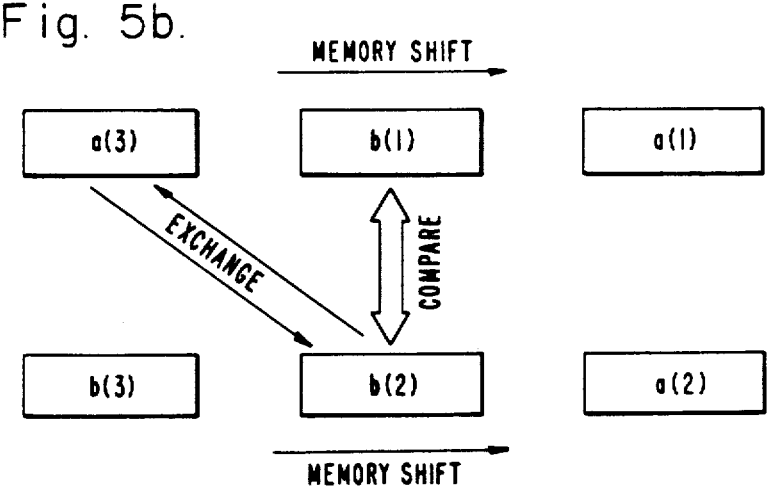

After the exchange is completed, the memories are appropriately sequenced so as to access the next subsequent portions. The situation schematically presented in FIG. 5(b) represent the status of the memory portions and data items following a sequencing of this nature. Within the upper memory, portion a(1) has shifted beyond the comparison point. Currently accessed from the upper memory is that portion which is next-subsequent to the initially-accessed a(1) and whose present contents is the data item which was formally contained in portion b(1) of the lower memory. The indicated portion a(3) becomes the new next-subsequently-accessed portion. In the lower memory, the previously-accessed portion which has now shifted beyond the comparison operator carries with it the data item previously contained in portion a(2) of the upper memory. Portion b(2) is now presently accessed for comparison purposes. Memory portion b(3) has moved into next-subsequent proximity to the comparison operator.

Thus with both memory loops as now shifted, the up-exchanged b(1) data item from the lower loop will be the upper-loop member in a new present comparison, while the lower-loop item to which it will be compared is that which was previously immediately-subsequent to item b(1). Upon the detection of a match condition between items b(1) and b(2), the indicated diagonal exchange would send b(2) into the next-subsequently-accessed upper-loop memory portion a(3), while bringing the item from that next portion down into the presently-accessed portion b(2) of the lower memory.

4. Resultant Self-Association

It is with reference to a situation such as that illustrated in FIG. 5(b) that an important resultant capability of the present invention becomes apparent. It may be recalled that the data item from b(1) was drawn into the upper loop because of having been matched with, and hence related to, an existing upper-loop data item. If in an analogous fashion the data item in memory portion b(2) is similarly related to the now up-exchanged element from memory-portion b(1), the match-and-exchange process will cause the data item from b(2) to be drawn into the upper loop as well. It is to be noted that this subsequent upward exchange will be effectuated even though the b(2) item might not otherwise have been directly matchable with, and hence related to, items initially contained in the upper loop.

A relational-exchanging operation of this nature gives rise to several data-flow tendencies which form the basis for the present invention's self-associational capability. Three such tendencies are especially significant. First, the up-exchanging of a matched item to the next-subsequent memory portion will tend to cause related data items to collect in adjacent portions of the upper memory. Second, an up-transferred data item will now itself be available for subsequently-performed match-and-up-shift operations. Thus if the lower loop contains chains of mutually-related data items, the drawing of one item of the chain into the upper loop will tend to cause other parts of the chain to be brought up as well. This drawing up will occur even through these other chain parts might again not have been directly matchable with original upper-loop items. Third, the down-shifting of given data items to the lower loop, followed by the absence of an up-shift upon the occurrence of a match failure in subsequently-performed comparisons, will tend to remove from the upper loop those data items which bear no relation to other upper-loop items.

The drawing up of lower-loop data items not originally related to upper-loop items is a form of self-association, while the collection of related data items in adjacent memory portions is regardable as a form of associative learning. In addition, the process of removing from the upper memory those items which are unrelated to other items of current interest is regardable as a form of desirable forgetting. The consequential self-associational learning with respect to desired information, in combination with the forgetting of undesired information, are central attributes of the present invention which make possible the realization of a variety of artificial-intelligence functions.

C. System Considerations

1. Array Building Blocks

The fundamental situation of sequentially-accessed first and second memories interacting by means of a comparison and exchange operation can become the foundation for basic inventive building blocks which may, in turn, be linked to form various kinds of memory arrays.

a. Paired Cluster

Figure 6B:
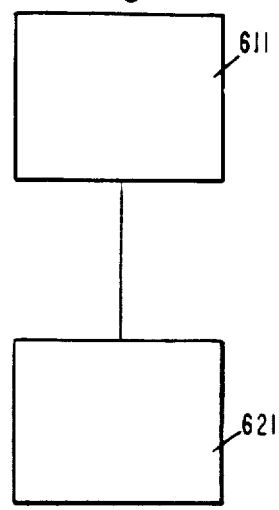

By themselves, two such first and second memories may be regarded as a paired cluster. FIGS. 6(a) and 6(b) show alternative representations for one such cluster. FIG. 6(a) illustrates a functionally-referenced form indicative of the present-invention's memory-sequencing and compare-and-exchange operations. First and second "circulating" memories 610 and 620 are thus shown to interact by means of compare-and-exchange operator 615. The corresponding hardware-referenced form presented in FIG. 6(b) is indicative of the typical situation, further discussed below, where single-board computers 611 and 621 are utilized to implement the present inventive concepts. In a hardware realization of this nature, the memory-sequencing and compare-and-exchange operations are performed by mechanisms internal to the respective single-board computers.

b. Triangualted Cluster

A second basic building block is realized by means of a straightforward derivation from the paired cluster. This derivation involves associating a third memory with two other inventively-interacting first and second memories. The resulting three-memory structure is conveniently regardable as a triangulated cluster.

The third memory would resemble the others by possessing in itself a plurality of individually-accessible memory locations. In addition, the mechanisms utilized to effectuate a sequential accessing of the first and second memories would include appropriate mechanisms for performing a similar type of sequential accessing in the third memory with respect to each of a predetermined plurality of its memory locations. As regards the pair-wise-comparison and a diagonal-exchange operations, the third memory would interact with the first memory in a manner analogous to the interaction between the first and second memories. Within the three-memory situation, therefore, the mechanisms utilized to effectuate the pair-wise comparison and diagonal-exchange operations would include appropriate sub-mechanisms for performing the respective comparison and exchange operations between the first and third memories as well as between the first and second memories.

Figure 7B:
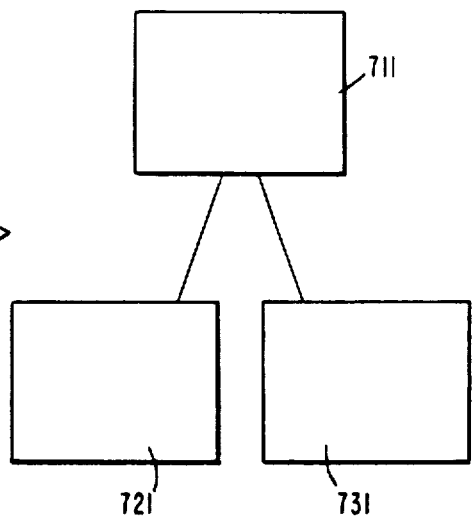

In correspondence with the pair cluster's functionally-referenced and hardware-referenced forms respectively illustrated in FIGS. 6(a) and 6(b), the functionally-referenced and hardware-referenced forms for the triangulated cluster are presented in FIGS. 7(a) and 7(b). Circulating memories 710, 720 and 730 in-FIG. 7(a) are thus again indicative of the required memory sequencing, while operators 715 and 716 are similarly indicative of the compare-and-exchange operations respectively performed between memories 710 and 720 and between memories 710 and 730. Units 711, 721 and 731 in FIG. 7(b) are again indicative of a typical situation in which single-board computers may be utilized to realize the memory cluster and where the sequencing and compare-and-exchange operations are performed by mechanisms internal to respective first, second and third single-board computers.

2. Branched Hierarchy

A particularly-useful version of an Associative Loop Memory is formed by arranging a plurality of the above-described triangulated clusters into a branched hierarchy. A functionally-referenced form of a hierarchy of this nature appears in FIG. 8. The hierarchy is seemed to be of a type which contains a predetermined plurality of highest-order through lowest-order levels, with the second and third memories of any given cluster at any given non-lowest order level each becoming first memories with respect to in-turn triangulated memories at the given next-lower level of the hierarchy. Memory loop 810 is thus seen to be the first memory of a triangulated cluster which includes memory 820 as a second memory and memory 830 as a third memory. Memory 810 occupies the first, highest-order level of the array, while memories 820 and 830 occupy the second-order level of the array. It is apparent that second and third memories 820 and 830 become in themselves first memories with respect to memories at the third-order level of the array. Memory 820 is thus a first memory with respect to memories 842 and 843, while memory 830 is similarly the first memory with resect to memories 852 and 853. Each of these third-order memories similarly becomes the first memory with respect to fourth-order memories 862 and 863, 882 and 883, 872 and 873, and 892 and 893. Although the array may as indicated be extended to any appropriate number of levels, the example array of FIG. 8 contains no levels of order lower than four, and hence the illustrated fourth-order memories serve only as respective second and third memories in relation to the illustrated third-order memories.

In a branched hierarchy of this nature, the previously-discussed mechanisms for sequentially performing pair-wise comparison and diagonal exchange would each include appropriate mechanisms for performing their respective associated functions with respect to each first and second and each first and third triangulated-memory-pairing in the overall hierarchy. It is apparent, therefore, that the same types of interactions will take place between any paired members of any triangulated cluster at any level of such an array.

3. Generalized Arrays

It will be apparent that appropriate arrangements of the previously-described paired and triangulated memory clusters may be employed to realize any number of different array configurations. Any such array may be more-formally regarded as an interconnected totality of a plurality of the paired and triangulated clusters. A generalized interconnected array of this nature would have an associated plurality of different-ordered levels in which one of the first memories of a given cluster would be a highest-order memory. The remaining memories in the array, being successively-less operatively proximate to the highest-order memory, would respectively be successively-lower-order memories, with those memories least operatively proximate to the highest-order memory being lowest-order memories.

Each of the individual memories of the array totality would again possess individually-accessible memory portions, just as the overall array would again possess appropriate mechanisms for sequentially accessing, in each of the individual memories, each of a predetermined plurality of memory portions. As before, a given portion upon access would thereby become for the given memory a presently-accessed portion, with subsequently-accessed portions of the given memory thereby becoming subsequently-accessed portions.

Such an array would also contain appropriate mechanisms for pair-wise comparing the data-item contents of the presently-accessed portions of the respective first and second memories of each of the array's paired clusters and of the respective first and second and first and third memories in each trangulated cluster. The array would further contain appropriate diagonal-exchange mechanisms, responsive to the comparison mechanisms, which would be operative upon the occurrence of a match between any two pair-wise compared data items. These mechanisms would then diagonally exchange the data item in the presently-accessed portion of the associated lower-order memory with the item in a predetermined one of the subsequently-accessed portions of the associated higher-order memory.

Among the advantageous specific configurations for a cluster totality is a diamond-shaped lattice such as the one which appears in FIG. 9. Memory 910, in addition to being the first memory of the triangulated cluster which includes memories 922 and 923, is the highest-order-memory. Memories at the successive levels of the lattice are successively-less operatively proximate to memory 910 and are accordingly the respective successively-lower order memories. Specifically, memories 922 and 923 are second-order memories in the overall lattice. Similarly, memories 932, 933 and 934, in addition to respectively being the second and third memories of the triangulated cluster which includes memory 922 as a first memory and the second and third memories of the cluster which includes memory 923 as a first memory, are also third-order memories with respect to the overall lattice. In analogous fashion, memories 942 through 945 are fourth-order memories while memories 952 through 956 are fifth-order memories. Memories 962 through 965 are likewise sixth-order memories while the seventh-order memories include memories 972 through 974. The eight-order memories are memories 982 and 983, and the sole ninth-order memory is memory 992. Memory 992, being least operatively proximate to the highest-order memory 910, is the array's lowest-order memory.

It may be observed that the illustrated lattice is in effect almost entirely comprised of triangulated clusters. The only partial exception to this composition scheme is memory 992, which in one sense may be viewed as the second memory in two different paired clusters, these respectively including memories 982 and 983.

4. Advantageous Supplemental Features a. Iterative Operation

It may be observed that in its basic form, the invention's fundamental data-transfer technique may be characterized without limitation in terms of only a single sequential pass through a given designated series of memory portions from respective first and second memories.

In a number of operational situations, such as, for example, where combinatorial pairing of the type previously described is desired, it becomes convenient to provide that the technique's accessing, comparing and exchanging be performed iteratively on a cyclical basis respect to given series of respective first and second memory portions. In a typical hardware implementation, a paired-cluster embodiment would thus include appropriate mechanisms for causing the otherwise-present sequential-accessing mechanisms, together with the associated pair-wise comparison mechanisms and diagonal-exchange mechanisms, to operate iteratively with respect to the given predetermined serial plurality of respective memory portions. Analogously in the case of a triangulated memory cluster, the iterative-operation mechanisms would include appropriate mechanisms for causing the third memory's sequential-accessing mechanisms, together with its associated pair-wise comparison mechanisms and diagonal-exchange mechanisms, to operate iteratively with respect to a given predetermined plurality of memory locations in the respective first and third memories. In addition, where a plurality of paired and triangulated memories are arranged into configured arrays such as a branched hierarchy, the mechanisms which perform the iterative operation on an inter-cluster basis would include appropriate mechanisms for performing such iterative operation with respect to each first and second and each first and third triangulated memory-pairing in the overall hierarchy. Analogous considerations would apply with respect to any generalized array comprised of a plurality of interconnected paired and traingulated memory clusters.

Any such array would accordingly be provided with appropriate mechanisms for causing the subject iterative operations to be performed with respect to each of the memories in all of the array's clusters.

b. Blank Acquisition

It often becomes especially advantageous to provide that, in any given one of the subject memories, a certain predeterminable percentage of the designated memory portions remain free from data. A data-free condition of this nature enables additional data items to be loaded into the memories without requiring, or creating the danger of, cancellation of existing data. In a preferred practice of the invention, the desired data-free condition is brought about by providing the invention's methods and mechanisms with the supplemental capability of clearing various ones of the memory portions in question. With the absence of a data item at any given one of the subject portions being conveniently regardable as establishing a data-free blank condition, it further becomes convenient to regard the clearing operation as being a process for acquiring blanks. The manner in which this blank-acquisition process may be implemented will now be described.

The process generally encompasses several preliminary thresholding steps, together with a more-specific sequence of operations by means of which the blanks themselves are actually acquired. Before proceeding with the description of the overall process, however, it is to be noted that although in any given operational situation the exact nature of the blank-acquisiiton sequence itself will be precisely predeterminable, the particular set of steps to be followed will tend to be context-dependent. Various ones of these particularized sequences will be set forth following a discussion of the manner in which the overall acquisition process would be implemented in a number of generic environments of interest. The generic environments will include that of any given first memory, then that of the second memory of any paired cluster, and finally that of both triangulated clusters and composite arrays.

The description with respect to any given first memory begins by stipulating that the invention's fundamental tranfer technique be augmented with at least four additional steps. The first of these steps is the establishment of a first blank-count threshold comprising a predetermined quantity which is to be the desired number of the subject first-memory portions which are to remain data-free. The second step is the performance of a continuing tabulation of a first actual blank-count comprising the number of the subject portions which are in fact data-free. The third of the supplemental steps is a determination of whether the first actual blank-count has fallen below the desired blank-count threshold. In accordance with the fourth step of the process, there is performed, upon the occurrence of a determination that the actual count is below the threshold, a first blank-acquisition sequence whose purpose is to increase the described first actual blank-count. As indicated above, the specifics of blank-acquisition sequences will be described in greater detail below.

It will be apparent that an actual embodiment would include appropriate mechanisms for performing the various operations of the supplemental four-step process. As between any two hardware-embodied memories, this aspect of the invention would then typically include an appropriate mechanism for establishing the described first blank-count threshold, as well as a similarly-appropriate mechanism, operatively associated with the first memory, for performing a continuing tabulation of the required first actual blank count. An actual realization would further include a first thresholding mechanism, operatively associated with the described first threshold-establishment mechanism as well as with the described first-actual-blank-count mechanism. This thresholding unit, configured to be responsive to both the established threshold and the actual count, would be the means by which a determination is made as to whether the first actual count has fallen below the desired first blank-count threshold. A typical embodiment would further include a first-memory-clearing mechanism, to become operative a determination that the actual count is below the threshold. It is this mechanism which would actually perform the first blank-acquisition sequence.

Because it will typically be advantageous to also stipulate that a certain percentage of the sequentially-accessed portions of the second memory of any given paired cluster likewise be kept data-free, a memory of this nature is another of the environments of interest for a composite blank-acquisition process. In general, the same types of procedures and mechanisms utilized in conjunction with the first memory would also be employable in conjunction with the second memory. The second memory would thus be subjected to corresponding versions of the previously-described steps involving the establishment of a second blank-count threshold, the performance of a continuing tabulation of a second actual blank-count, a determination of whether the second actual blank-count has fallen below the desired second blank-count threshold and finally the performance of a second blank-acquisition sequence. As with the first such sequence, the purpose of the second is to increase the second actual blank-count in those situations where the second actual count is determined to be below the second threshold. The subject-cluster would then typically again include appropriate mechanisms for establishing the second threshold, as well as appropriate mechanisms for performing a continuing tabulation of a second actual blank-count. Operatively associated with the second threshold-establishment and second actual-blank-count mechanisms would be second thresholding mechanisms which would determine whether the second actual count has fallen below the desired second threshold. Also similarly included would be second-memory-clearing mechanisms, operatively associated with both the second thresholding mechanisms and the second memory, for performing a second blank-acquisition sequence so as to increase the second actual blank-count upon a determination that the second actual count has fallen below the second threshold.

Analogous considerations would likewise apply to the maintenance of predetermined data-free percentages in the next environment of all three memories of a general triangulated cluster. Such a cluster would thus include appropriate mechanisms for establishing respective first, second and third blank-count thresholds with respect to each of the component first, second and third memories. Also included would be appropriate mechanisms, operatively associated with the first, second and third memories of the given cluster, for performing continuing tabulations of first, second and third actual blank-counts respectively comprising the number of the sequentially-accessed, first, second and third memory portions which are in fact data-free. Similarly included would be thresholding mechanisms, operatively associated with the threshold-establishment mechanisms and with the actual-blank-count mechanisms of the cluster, for determining whether any of the respective actual blank-counts has fallen below the desired respective first, second and third blank-count thresholds. For this cluster, there would then also be included appropriate memory-clearing mechanisms, operatively associated with both the thresholding mechanisms and the described first, second and third memories, for separately performing respective first, second and third blank-acquisition sequences so as to increase whichever of the described actual blank-counts is deficient, with any given one of these acquisition sequences being performed upon a determination that the corresponding one of the actual counts is below the associated threshold.

The final environment encompasses generalized memory arrays of the previously-described type involving an interconnected plurality of paired and triangulated memory clusters, with a branched hierarchy employing triangulated clusters being of particular interest. For applicability in this context of generalized arrays, the mechanisms described in the environments of unitary paired and triangulated clusters could be extended so as to provide all of the clusters of a given array or hierarchy with both predetermined data-free percentage thresholds and associated threshold-establishment, actual-count tabulation, thresholding, and memory-clearing mechanisms.

With regard to each of the above-described environments involving the performance of a blank-acquisition sequence, it is to be supplementally noted that preferred realizations will often include appropriate associated mechanisms which ensure that the respective blank-acquisition sequences are performed iteratively until the given deficient actual blank-count exceeds the associated blank-count threshold by an associated predetermined number. Iterative performance of a given acquisition sequence contributes to a degree of operational stability by preventing a possible continuing interruption of normal memory operations once the memory in question has exceeded its threshold capacity.

c. Specific Sequence Formats

Specific blank-acquisition sequences will now be discussed. The discussion will be presented in the context of the principal operational situations in which the sequences may commonly be employed. The diverse nature of certain aspects of these various situations will be seen to give rise to slightly-different, although still readily-predeterminable, versions of the subject sequence.

Several considerations may be noted preliminarily. First, in each of the operational situations to be discussed, the determination of whether the actual blank-count has fallen below the associated threshold may in general conveniently be performed prior to the execution of a diagonal-exchange operation. Second, it will often further be convenient to more specifically perform the thresholding determination prior to each pair-wise comparison operation and hence at a time closely associated with the present sequential access of respective memory portions in the respective paired memories of a given cluster. Third, it will prove helpful to recall that a blank-acquisition sequence, of whatever specific form, is typically performed following a determination that a given actual blank-count has fallen below the associated blank-count threshold. Finally, it will also prove convenient to observe that the net effect of the performance of a blank-acquisition sequence will often be the inhibiting of the ordinary operations which the memory in question normally performs with other associated memories. As mentioned previously, it will often be advantageous to maintain this inhibition in effect until iterative blank-acquisitions cause the actual blank-count to exceed the given threshold by a predetermined number.

i. First Memory in Paired Cluster

In this situation, the blank-exchange sequence begins with a determination of whether the presently-accessed data item from the given second memory is a blank. If not, no exchanges are permitted and the respective memories are ultimately caused to advance to their next memory portions where the next of the respective sequential accesses is performed. In actual implementations of the invention, this advancing will typically mean that once a determination is made that the second item is not a blank, the otherwise-performed pair-wise comparison is also skipped and the memories are made to advance directly to the performance of the next sequential access of the respective memory portions.

If in contrast the presently-accessed data item from the second memory is in fact found to be a blank, the given blank is exchanged with a predetermined one of the data items from the first memory. In an actual implementation, it is often convenient to include appropriate mechanisms for effecting a direct exchange of the second-memory blank with the data item from the presently-accessed location of the first memory. Following the completion of this exchange, ordinary memory operations could be made to continue. As noted previously, however, it will often prove advantageous to repeat the blank-acquisition sequence until a desired predetermined number of blanks has been accumulated in the upper memory. Ordinary operations would then proceed only after the desired accumulation had been effectuated.

ii. First Memory in Triangulated Cluster

The general nature of the blank-acquisition sequence in a triangulated cluster will be the same as that for a paired cluster except that the process will also include a determination of whether the presently-accessed data item from the associated third memory is a blank. This effectively means that in a triangulated cluster the acquisition sequence will begin with a determination in the alternative of whether either of the presently-accessed data items from the second or third memories is a blank. If neither is a blank, the system will ultimately be made to advance directly to the performance of the next sequential access of the respective memory locations in all three of the memories. If either of the presently-accessed portions from the respective lower memories is found to contain a blank, then that blank is exchanged into the upper memory. Once again, it will often be convenient to stipulate that this exchange be a direct one from the given presently-accessed, lower-memory, blank-containing portion into the associated presently-accessed upper-memory portion. It will also again often be convenient to further stipulate that the acquisition sequence be peformed repeatedly and that as a consequence ordinary operations between both the first and second and first and third memories be inhibited until a sufficient number of blanks has been exchanged into the upper memory to cause the number of blanks in the upper memory to exceed the given threshold by a predetermined number.

iii. Non-Lowest-Order Second Memory in Paired Cluster

The general situation here is that in which a given memory, although serving as the second memory of a given paired cluster, is also configured as the first memory with respect to in-turn clustered memories at lower-order levels of a more-general array. In such a case, a determination that the actual blank-count of this "intermediate" second memory has fallen below the associated desired blank-count threshold would be followed as usual by a blank-acquisition sequence. This particular sequence would be performed with respect to whatever lower-order memory or memories are associated with the subject intermediate memory. The sequence itself would as appropriate be basically the same as that performed for a first memory in either a paired or triangulated cluster. A distinguishing feature, however, would be that in addition to an inhibition of the ordinary operations which this intermediate memory performs in conjunction with any associated lower-order memories, there would also be an inhibition of the ordinary operations which the subject memory performs with its associated higher-order first memory. The respective inhibitions would continue until, in general, a blank had been exchanged into the second memory from the associated lower-order memories, or often preferrably, until a predetermined number of such blanks had been repetitively exchanged into the subject memory. Once the desired blank-exchanging operations were completed, ordinary operations with respect to both lower and higher-order memories would typically be allowed to continue.

iv. Lowest-Order Second Memory in Paired Cluster

Where the subject paired-cluster second memory is a lowest-order memory of a given array, there will be no in-turn lower-order memories in relation to which the subject second memory may serve as an intermediate first memory. There will consequentially be no external lower-order source of blanks which the memory can acquire, just as there will consequentially be no lower-order storage positions into which the given second memory can transfer what are effectively "excess" data items. The typical procedure followed in a situation of this nature, once a determination is made that the given memory lacks sufficient data-free portions, is to simply execute a cancellation routine in which blank portions are created by discarding data in a predetermined manner. One possible cancellation routine could take the form of simply blanking the presently-accessed data item presented for comparison purposes to an associated higher-order first memory. This type of blanking would have the advantage of making a blank memory portion available to the higher-order memory in the event that a data-overflow condition there induces that memory to initiate a blank-acquisition sequence of its own.

v. Non-First Memories in Triangulated Clusters

In a triangulated cluster where there are now two lower-order memories which may experience a data-overflow condition, each would typically be configured to independently perform a blank-acquisition sequence similar to the appropriate one of those performed by the second memory of a paired cluster in either its non-lowest-order or lowest-order configurations. A distinguishing feature of the triangulated-cluster situation, however, is that the initiation of a blank-acquisition sequence in either of the second or third memories, while inhibiting ordinary operations which that memory would ordinarly perform with the given first memory, need not be made to cause an inhibition of the ordinary operations which the first memory undergoes with the other memory of the triangulation. Thus, for example, where an overflow condition was detected in the third memory, the third memory would then begin a blank-acquisition sequence and would thus typically not permit exchanges to take place with respect to the associated first memory. This inhibition need not nevertheless be made to induce a complementary inhibition in the normal operations, including data-exchange operations, which would otherwise take place between the first and second memories.

5. Knowledge-Retrieval System

A composite description of a particularly-advantageous configuration for the inventive building blocks will now be summarized. It will become apparent that in its general form this configuration will entail a branched hierarchical arrangement of triangulated memory clusters. It will also become apparent that the configuration corresponds to the example branched hierarchy presented in FIG. 8. The manner in which this configuration can be utilized for knowledge retrieval in both information-retrieval and artificial-intelligence contexts will be further discussed subsequently.

Thus, by way of summarization, the subject system contains a plurality of triangulated memory clusters, with each cluster having a first, second and third memory, and with each memory having individually-accessible memory portions. This triangulation plurality is configured as a branched hierarchy having an associated plurality of levels which include a highest-order level and a lowest-order level. The highest level possesses only a first memory of an associated single triangulated cluster, with each of the second and third memories of each of the clusters at any given one of the other non-lowest-order levels individually becoming first memories with respect to in-turn triangulated memories at the next lower level of the hierarchy.

The subject system also contains appropriate mechanisms for sequentially accessing, in each of the hierarchy's memories, each of a predetermined plurality of memory portions, with a given portion upon access thereby becoming for that memory a presently-accessed portion and with the remaining subsequently-accessed portions thereby becoming subsequently-accessed portions for that memory. The system similarly includes appropriate mechanisms for pair-wise comparing the data-item contents of the presently-accessed portions of the respective first and second and first and third memories in each triangulated cluster at each level of the hierarchy. Likewise contained in the system are appropriate mechanisms, operative upon the occurrence of a match condition between any two pair-wise compared data items, for diagonally exchanging the data item in the presently-accessed location of the associated lower-order memory with the data item in the next-subsequently-accessed location of the associated higher-order memory.

Further included are appropriate mechanisms for causing the described sequential-accessing mechanisms, together with the associated pair-wise comparison mechanisms and diagonal-exchange mechanisms, to operate iteratively with respect to a given predetermined plurality of memory portions in each memory in each of the triangulated clusters of the hierarchy.

Within this composite system, the absence of a data item at any given one of the described sequentially-accessed memory portions would be regarded as establishing a data-free blank condition. The system then includes appropriate mechanisms for establishing, with respect to each of the described first, second and third memories in each of the described triangulated clusters, respective first, second and third blank-count thresholds comprising respective predetermined quantities, each of which is to be the desired number of the described sequentially-accessed portions of the respective first, second and third memories which are to remain data-free. The system also contains appropriate mechanisms, operatively associated with each of the described first, second and third memories in each of the described triangulated clusters, for respectively performing continuing tabulations of first, second and third actual blank-counts comprising the respective number of each of the described sequentially-accessed first, second and third-memory portions which are in fact data-free. The system further includes appropriate thresholding mechanisms, operatively associated with the described threshold-establishment mechanisms and the described actual-blank-count mechanisms, for determining whether any of the described actual blank-counts has fallen below the described respective first, second and third blank-count thresholds. The system then additionally contains appropriate memory-clearing mechanisms, operatively associated with both the described thresholding mechanisms and each of the described first, second and third memories, and operative upon the determination that any one of the described actual counts is below the associated threshold, for separately performing respective first, second and third blank-acquisition sequences so as to increase whichever of the described actual blank-counts is deficient. In this system configuration, these described respective actual blank-acquisition sequences are to be performed iteratively until each given deficient actual blank-count exceeds the associated threshold by an associated predetermined number.

The data items stored within this hierarchy would be of the previously-described type which are not required to be of uniform length. Thus, any given presently-accessed data item from any given one of the described first memories would comprise an N-tuple of N data elements, and any given presently-accessed data item from any given one of the described cluster-associated second or third memories would comprise an R-tuple of R data elements.

With respect to data items of this nature, the described comparison mechanisms include appropriate submechanisms for performing a combinatorial operation in which each of the N elements from the first data item is pair-wise compared with each of the R elements of the associated lower-order data item. A match between the members of any one of the described combinatorial pairs would be taken as representing a match condition between the subject accessed data items from the respective first and associated memories.

II. Example Mechanization

An example specific implementation of the present invention will now be discussed in detail. The general contextual form of this implementation will be seen to be that of a plurality of individual memories which have been configured into a branched hierarchy such as the one which appears in FIG. 10.

A. Branched Hierarchy

It will be apparent that just as the hardware-referenced forms of the paired and triangulated clusters repectively illustrated in respective FIGS. 6(b) and 7(b) corresponded to the functionally-referenced paired and triangulated clusters respectively illustrated in FIGS. 6(a) and 7(a), so also may the branched hierarchy of FIG. 10 be regarded as a hardware-referenced version of the functionally-referenced branched hierarchy of FIG. 8. In correspondence with other previously-discussed sections of this specification, it may parenthetically be reiterated that a hierarchy of this nature may additionally be regarded as being formed from a repeated plurality of the hardware-referenced triangulated clusters. As with the mechanisms illustrated in FIGS. 6(b) and 7(b), the individual units 1010 through 1070 of the FIG. 10 implementation are indicative of a conveniently-mechanized situation in which memory-sequencing, pair-wise comparison and diagonal exchange operations are performed internally to each unit. Each unit is seen to include the respective first, second and third ports by means of which the given unit communicates with other units of the hierarchy.

Unit 1010 serves both as the highest-order memory of the array and as the first memory with respect to the triangulated cluster which also includes units 1020 and 1030. Units 1020 and 1030 together comprise the second-order level of the hierarchy and also serve as and the second and third memories of the first triangulated grouping. Memories 1040, 1050, 1060 and 1070 form the third-order-level memories of the array as well as respectively forming the second and third memories of independent triangulated clusters with respect to which the respective second and third units 1020 and 1030 serve as the first memories. It is apparent that the array could be extended by utilizing the second and third ports of the respective memories 1040 through 1070 as the connection points for in-turn triangulated memories at lower-order levels of the array.

In an actual mechanization, the illustrated port 1 of top element 1010 would conveniently be made to communicate with a host computer. The indicated port 4 on each of the respective units would typically be utilized to effectuate various kinds of inter-unit housekeeping operations of a largely-conventional nature. Furthermore, although the ordinary flow of data within the array will typically be along the various branches of the hierarchy, it is this fourth port which may be utilized for various kinds of supplemental data transfers, as for example, direct exchanges between individual units and the host computer. Exchanges of this nature could include the initial loading of data into the hierarchy, as well as examination or even preservation of individual loop contents at various stages of inventive processing.

Single Board Computers

In an actual mechanization of the present invention, the individual units such as element 1010 of FIG. 10 could be implemented by means of a single board computer (SBC). SBCs which can be adapted for such implementation are commercially available, as for example, the MCPU-800 produced by the Miller Technology Company.

A unit of this nature typically contains the basic components illustrated in FIG. 11. There is, for example, a central processing unit (CPU) 1110, a programmable read-only memory (PROM) 1120, a random access memory (RAM) 1130 and an input/output (I/O) buffer 1140. So as to accommodate communications with additional subordinate memories, the illustrated SBC also contains a second I/O buffer 1150 which represents an addition to the commercially-available MCPU-800. It will be apparent to those skilled in the art that this addition may be effectuated by means of a straightforward application of conventional design considerations.

The various illustrated internal elements communicate with each other by means of conventional bus 1160, while the principal data-transfer exchanges with other external units are effectuated by means of conventional channels 1171, 1172, 1173 and 1174.

A significant advantage of the present invention is an economy of implementation which follows from being able to utilize the same basic type of SBC for each memory unit in the invention's effectively-modular arrays. Nevertheless, the upper most unit 1010 of a typically-implanted inventive hierarchy would also uniquely contain an appropriate modification enabling it to carry out specialized communications with a host computer. This modification, again achievable through an implementation of conventional design considerations, is schematically illustrated in FIG. 11 by bus extension 1165, third I/O buffer 1180 and associated I/O channel 1190.

Within the example SBC in its form common to most units of the hierarchy, RAM 1130 would be utilized as the subject sequentially-accessed memory, a designated series of whose successive portions would typically be employed to store the individual data items. PROM 1120 would in firmware form contain appropriate instructions for carrying out the various previously-described procedures of the present invention. Such firmware would consequentially serve as a principal element of the actual realization of the various mechanisms, elsewhere described in generalized terms, utilized in practicing this invention. It will be apparent to those skilled in the art that this type of mechanization-by-firmware is a generally-straightforward task once the nature of the operations to be accomplished have been specified and the associated relevant operating parameters stipulated.

In accordance with conventional computer-operation theory, the manipulations specified by the firmware stored in PROM 1120 and performed with respect to data-items stored in RAM 1130 would be carried out under the executive guidance of CPU 1110. This guidance would include interrogation of the PROM for instructions and then generalized intra-board control of the various illustrated components in accordance with these instructions.

C. Timing

An example protocol governing inter-unit timing between the various modules of the FIG. 10 hierarchy will now be discussed in detail. Before proceeding with the detailed discussion, however, several generic considerations will be preliminarily emphasized.

It will first of all be evident that a basic purpose of the described timing is inter-module coordination. There must be a sufficient degree of such coordination to ensure that each module will possess the inputs it requires at any given time for any given internally-preformed operation, as well as to more-generally ensure that inter-unit operations such as pair-wise comparison and diagonal exchanging be actually effectuated.

It will secondly become apparent that the timing controls to be described are consistent with the modular design philosophy of the example hierarchy in that they require synchronization on a local, adjacent-module basis only. It will nevertheless thirdly be apparent that although the synchronization has been directly mechanized on only this local basis, such synchronization will indirectly tend to have a "propagating" effect whose net result is a form of global synchronization throughout the overall array.

It will finally become apparent that the input and output timing sequences to be described represent an application of conventional "handshaking" considerations and hence are presented for illustrative purposes only.

As a point of reference, a basic environment for the inter-unit I/O protocol of a modular triangulated cluster is schematically presented in FIG. 12. The "A" unit 1210 schematically represents the cluster's first memory, including associated processing circuitry. "B" and "C" units 1220 and 1230 similarly represent the memories and associated circuitry of the second and third units of the given triangulation. Each of the three units is shown to possess three I/O ports which respectively communicate with the associated internal RAM by means of the schematically-illustrated buffer channels. The buffer channels for the various ports are shown in the typical configuration of accessing separate portions, RA1, RA2 and RA3 for example, of the associated RAM.

A convenient format for the subject data will often be that of a composite data item comprised of 32 bytes, with each of the bytes comprised in turn of an 8-bit term. Because the indicated inter-unit communication channels 1215, 1225 and 1235 are conveniently implemented in only 8-bit form, a 32-step sequence will thus be required to transfer a given data item from one unit to another over these channels.

The detailed description of the transfer sequence itself will be facilitated by redescribing certain aspects of the invention's compare-and-exchange operation in terms of the FIG. 12 environment. The schematic diagram of FIG. 13 is thus generally illustrative of the operations previously discussed in detail in conjunction with FIGS. 5(a) and 5(b). More-specifically, however, FIG. 13 indicates that a comparison is to be performed between a presently-accessed data item of the first memory 1210 and a presently-accessed data item from the appropriate one of the lower-order second and third memories 1220 and 1230. The upper-memory data item has been labeled with the indicated PXA, with the X being indicative of having been derived from portion RA2 or RA3 as the case may be. The lower-order item is analogously labeled PXL, the "X" here being indicative of whichever of the second and third memories supplied the item in question. The A-memory's next-subsequently-accessed data item, utilized in conjunction with a diagonal-exchange operation, has been identified with the label NXA, the "X" being similarly indicative of next-subsequent proximity to a given one of either RA2 or RA3. In accordance with principles previously discussed, it is with respect to items NXA and PXL that an exchange is ultimately effectuated in the event of a match between items PXA and PXL.

FIG. 14 presents an actual composite timing sequence for data transfers among the units of a FIG. 12-type triangulated cluster. Generic considerations again advantageously noted prior to a detailed discussion of this sequence include the following: First, it will be apparent that although the illustrated transition lines A1 through C1 individually show the timing sequences for only the three ports of the "A" unit 1210 and the respective first ports of the "B" and "C" units 1220 and 1230, similar timing relationships would pertain to the second and third ports of the B and C memories, in further accordance with the subject modular design philosophy. It will similarly be apparent that the subsequent recitations of the performance of either an input operation or an output operation respectively include an entire composite procedure of either receiving a data byte into a data buffer and transferring it into memory or conversely removing one from memory and transferring it to a buffer. It will thirdly become apparent that in accordance with conventional logic-communication principles, a given input operation would not be effectuated until conventional, but here not explicitly discussed, "handshaking" signals indicated that new data was "on-line" and hence available for inputting.

It may conjunctively be noted that as between the adjacent units, the data transfers may for convenience take the form of transferring only copies of the stored data items, the items themselves being initially preserved at the accessed memory portions for potential future use. A given copy would then be used to overwrite an original data item only if a "permanent" change of memory contents is ultimately mandated. A practical purpose of such copies-only transferring is to promote net operational efficiency by enabling all data items required for both the comparison and exchange operations to be automatically transferred in each composite transfer sequence regardless of whether a match is ultimately determined to exist. An automatic all-item transfer of this nature obviates the necessity for a normal-cycle interruption and associated special-exchange-cycle activation otherwise required in the event of a match. Each full cycle of the particularized composite sequence of FIG. 14 will thus later be seen to include the comparison-independent, inter-memory transfer of the data items required to effectuate a diagonal exchange. As previously discussed, these items are a given next-subsequently-accessed item from the A memory and a given presently-accessed data item from a given lower-order memory.

It will finally be apparent that the mutually-serial nature of the below-described transfer operations performed at the various ports of a given memory unit inherently follows from the specific nature of the exemplary single board computers utilized to implement each of these units. The subject SBC's contain only one, serially-processing CPU. This CPU is accordingly capable of giving directions only serially to its several associated ports.

By way of introduction, the composite sequence itself is seen in FIG. 14 to generally encompass nine timing intervals. By means of the initial six, one byte of subject data items is transferred down into the top ports of the respective units prior to comparison processing. As stated previously and as indicated in the Figure, this basic six-interval subsequence would be repeated 32 times so as to effectuate the complete transfer of all 32 bytes of the composite data items of the example mechanization. It may be noted parenthetically that with appropriate adjustments, any one of these six intervals could be utilized as the starting point for the down-transfer process, just as long as the overall group of six is repeated the required 32 times.

Following the execution of the indicated comparison stage, data exchange is completed with the upward transfer effectuated from the respective top ports in timing intervals 7, 8 and 9. As with the downward transfer, only one data byte of each subject item would be transmitted in any given three-interval subsequence, the subsequence being repeated 32 times for total transfer.

More specifically now, intervals 1 and 2 begin the composite transfer process with a mutually-serial output operation from the bottom ports A2 and A3 of Module A. The items outputted are a given byte of the respective next-subsequently-accessed data items N2A and N3A. In interval 3 these items are inputted into the respective top ports B1 and C1 of Modules B and C. An analogous inputting is performed with respect to the top port A1 of Module A, there having previously been performed a likewise-analogous outputting of a next item NXS from an unillustrated module disposed superjacent to A in a composite-hierarchy context. (The special situation in which Module A is the hierarchy's apex memory, hence interacting with a host computer instead of a companion module, will be treated separately below.) In intervals 4, 5 and 6, the double-output, triple-input subsequence for the same ports is executed once more, this time with respect to presently-accessed data items P2A, P3A and PXS, the latter again being obtained from the superajacent module.

Once the 32nd iteration of the initial six-interval subsequence has been completed, all components of the appropriate presently-accessed data item from the upper memory are contained in the respective lower modules. The presence of these upper-memory items, in conjunction with the presently-accessed data items internally-obtained from the lower memories themselves, enables the subject pair-wise comparison operations to now be carried out. It will parenthetically be apparent that although the described data-transfer procedure causes the required members of each pair to be collected in the lower two memories, an effectively-equivalent collection of the data items in the upper memory could alternatively be implemented. With the data items in the lower memories as described, however, the required comparison operation is accordingly performed by the processing circuitry of the respective B and C units.

Following the execution of the comparison operation, the 32-cycle upward-transfer process begins in interval 7 with one byte of the presently-accessed, lower-memory data items P1L, P2L and P3L of the just-completed comparison being outputted from the respective top ports A1, B1 and C1. In intervals 8 and 9 the latter two items are receieved into respective lower ports A2 and A3 of Module A, with an analogous reception again occurring at a lower port of the module disposed superjacent to A. The units of the subject triangulation would be configured to recommence the composite 9-interval sequence once the 32 upward cycles had been completed.

D. Firmware Flowchart

Described now will be a composite operating sequence which incorporates the firmware contained in the respective PROM's of the various modules of the example mechanization. This composite sequence will be seen to have been particularized for the specific application of information retrieval, as practiced by means of an inventively-configured branched hierarchy.

As an initial point of reference, it will be convenient to reiterate that as between two given memories, the invention fundamentally encompasses a basic three-stage operation of first, a sequential access of respective memory portions; second, a pair-wise comparison of the associated accessed data items; and third, a diagonal exchange of predetermined data items upon the detection of a match condition between those which are pair-wise compared. In the flowchart context of FIG. 15, this basic operation is shown to be realized by the firmware Intelligent Transfer Routine 1500 whose successive stages 1510, 1520 and 1530 implement the corresponding phases of the invention.

An example firmware implementation of the fundamental inventive stages is an integral aspect of the information-retrieval system whose overall operation is summarized in FIG. 16. The FIG. 16 processing begins with an Initialization Routine 1610 in which the overall memory hierarchy is prepared for information retrieval. In the Interrogation Routine 1620, the operator would initiate system functioning with the inputting of an information query. The sequential accessing of the various memories of the hierarchy commences with the Routine 1630. An on-going aspect of the sequential accessing is the ascertainment of memory status made in Routine 1640. Upon a determination at stage 1645 that the memories in question have not reached their predetermined threshold capacity, operation would continue with the performance of the Compare/Exchange Routine 1650. The Clear Routine 1660 is executed otherwise. A Query-Termination Routine 1670 is entered next, with this routine including a determination at stage 1675 of whether the processing of the given query has as yet been completed. If the query processing is still in progress, the Sequential-Access Routine 1630 is continued. If alternatively the subject processing is determined to have been completed, an Information-Output Stage 1680 is entered. Stage 1680 is typically followed by a stage 1690 in which the human operator would evalutate the outputted information so as to formulate further queries. These new queries would then be utilized to re-interrogate the system.

The composite processing sequence of FIG. 16 is expanded into more-detailed form by FIGS. 17, 18 and 19. With the depicted labels "A" through "F" being indicative of correspondences with the similarly-identified sequence segments in FIG. 16, system operation commences with the Initilization Routine begun at stage 1710. Although such initialization will typically encompass bootstrapping and housekeeping operations of a largely-conventional nature, this particular routine would in a preferred embodiment be appropriately structured so as to provide the overall system with a high degree of operational flexibility. Because in conjunction with the previously-discussed modular design philosophy it would preferably be desired to be able to operate the overall system with a subject hierarchy having essentially any desired number of modules, each in turn having a sequentially-accessible memory of essentially any desired size, the self-configuration stage 1720 thus entails such readily-realized considerations as a determination of the number of modules which have been interconnected for the performance of the given task, as well as an initial bootstrapping between these now-associated modules.

The establishment of operating conditions in stage 1730 includes the setting of sequencing parameters ultimately determinative of loop size and direction of rotation. Thus for each module, the data-element-dependent number of memory locations to be allocated for each memory portion is fixed, as is the length and nature of portion series for sequential processing.

At stage 1740, data would be loaded into the array. As will be further seen below, the data for information-retrieval will typically comprise an appropriately-formatted textual data base. The data-load operation itself would typically take the form of creating a data "stack" whose successive items would be injected on a continuing, available-blank-portion basis into the upper-most module of the array. With regard to the timing relationships previously described, it may be noted that an elementary two-step sequence may be employed to effectuate such injection. Data and associated signaling placed on-line during a first timing interval could, after an appropriate blank-status check, be read into the apex memory during a second timing interval. The likewise-below-described, threshold-referenced, memory-clearing operation would become the mechanism by which the injected data items are then filtered down into lower portions of the hierarchy. Following the loading of data of interest, the system would be ready for the receipt of the inputs from an operator.

The Interrogation Routine which begins at stage 1750 is thus entered next and encompasses query operation 1760. As will also be further discussed below, queries conveniently take the form of user-composed data items which preferably are injected into the apex memory loop by means of techniques the same as those used for the loading of the subject data base. It may also be noted parenthetically that it is the subsequent sequential-accessing, pair-wise comparison and exchange-upon-match operations, performed between these queries initially contained in the top loop and the data contained in lower portions of the array, which activate the actual information-retrieval.

The routines encompassed within processing sections C and D of FIG. 18 will be seen to be applicable to all non-lowest-order modules of the hierarchy, with lowest-order modules performing essentially only those functions involving interaction with higher-order memories.

The subject Sequential-Accessing Routine begun at stage 1810 thus initially entails at stage 1815 an effective shift of associated memory loops to the next set of presently-accessible portions. At stage 1820, the system operation enters the Memory-Status Routine. In this routine, a determination is made in stage 1825 of whether the first memory of the given triangulated cluster is "full." The fullness determination is referenced with respect to the previously-described standard of having an actual blank-count which has fallen below a predetermined blank-count threshold. If the memory is found to possess as-yet sufficient capacity, the system is ready to enter the set of operations 1830 which encompass the fundamental three-step sequence of the inventon. After this set is entered at stage 1832, the data items contained in presently-referenced memory portions are accessed in stage 1835 and pair-wise compared in stage 1840. If at stage 1845 a match is found to exist, the diagonal exchange of stage 1850 is effectuated, preferably by using the previously-described data copies to overwrite pre-comparison memory contents. If alternatively no match is found, no overwriting occurs and operation proceeds to subsequent portions of the processing sequence.

If likewise alternatively the first memory is determined at stage 1825 to have reached the predetermined capacity, a Clear Routine is entered at stage 1855. In stage 1858 of this routine, the data items from the respective presently-referenced portions of both of the lower memories of the given cluster are accessed. If at stage 1860 either of these lower items is found to be empty in the previously-described sense of containing a blank, a direct exchange of the type previously described is performed at stage 1865. If neither of the subject items is blank, operation returns to point "D" for accessing of the next respective locations in all three loops. Stage 1865's direct exchange, if performed, is followed by the indicated determination at stage 1870 as to whether the number of blanks in the upper memory is sufficient to exceed the given threshold by a likewise-given predetermined number. If not, the system returns to "D" for further loop rotation. If the outcome of the determination is alternatively that the most-recently-performed direct exchange has caused the first memory to have acquired the requisite number of blanks, system operation is allowed to proceed to Section E.

It may be noted parenthetically that Memory Status Routine 1820 would include appropriate flag-type mechanisms to enable it to recognize when the system is operating in the Clear mode. Such recognition is necessary during the period when blanks are still being accumulated. Consider, for example, the situation where operation returns to "D" from stages 1860 or 1870 at a time when the number of newly-accumulated blanks, while sufficient to exceed the blank-count threshold, is not yet sufficient to satisfy the "safety-margin" requirement. If routine 1820 focused only on the number of blanks, stage 1830 could be prematurely entered from stage 1825. Hence the need for an appropriate recognition capability.

Several corollary considerations may also be noted parenthetically. First, analogous clear routines, conforming to the blank-acquisition sequences specifically-described previously and again mechanized by means of PROM-contained firmware, would be followed for the second and third memories disposed at the lowest-order levels of the exemplary hierarchy. Second, a likewise-related process of checking for blanks at the top port of the hierarchy's apex memory would in a preferred embodiment be utilized in conjunction with loading new items into the array. Such items could be either new textual data for retrieval or new queries. It may conjunctively be noted that the accommodation of such new items is in fact the principal purpose for the Memory Status and Clear routines. By executing these routines on an ongoing basis, the overall hierarchy is continuously receptive to the application of either new data or new queries.

In FIG. 19, the Query-Termination Routine begins at stage 1910. The initially-performed determination of stage 1920 is whether, in accordance with the considerations exmplified by the respective loops of FIG. 1(*a*), one complete revolution and hence one complete sequencing of the upper-most memory has occurred. If not, the processing returns to the Sequential Access Routine at the indicated flow point "D."

It may be noted in the context of the terminology employed in the FIG. 19 summaries of stages 1920 and 1930 that "consciousness" is a convenient designation for the apex memory of an information-retrieving array. With the human mind serving as the motivational analog, the appropriateness of this terminology follows from such considerations as the most-commonly-displayed and the often presently most-significant nature of the data items which come to be collected in the subject loop.

If the alternative outcome of the one-revolution determination is that the sequencing has in fact been completed, there is next made at stage 1930 the companion determination of whether a desired total number of revolutions of the consciousness loop has been performed. The specification of such a number provides a degree of control over the retrieval process, there generally being a proportionate relationship between the number of revolutions and the number of formed associations. If more revolutions remain to be completed, the systems again returns to the Sequential-Access Routine at point "D." If alternatively the desired number of revolutions has in fact been completed, the system enters the results-presentation stage 1940, in which the accessed data items in the consciousness loop are typically presented to an operator display. A results-interpretation stage 1950 may then be entered, after which a new query may be formulated as indicated by stage 1960. Following a query reformulation, the overall hierarchy may once again be interrogated by returning to flowpoint "B."

It may be noted parenthetically that the result-interpretation and query-reformulation stages will typically be aided to a significant degree by the inherent capability of the present invention to effectivey provide meaningful avenues of alternative query. This alternative-suggestion capability follows in significant part from those items which, although not directly related to inputted queries, are nevertheless drawn into the consciousness loop by the invention's self-associating processes.

III. Example Operation

Considerations relating to an example operation of the subject inventive processing will now be discussed in the context of information retrieval.

A. Data Base

FIG. 20 illustrates a conveniently-employed three-element data item, denominated in composite as a "data triple." The Object "0" and the Value "V" will represent related elements of substantive information, while the Attribute "A" will be indicative of the relationship between the substantive elements. As utilized in the subject example, the Object and Value will be shown to be physically-proximate words on a given page of textual information, while the relation-indicating Attribute will be the associated page number.

With regard to data-item formatting, it may be noted that in one actual implementation an allocation which proved convenient was that of 13 characters each for the Object and Value, with 5 characters alloted for the Attribute. As a general rule, however, specific formatting will tend to be a question of often-subjective choice, largely dependent upon the particularized requirements of a given operational situation.

The fundamental features of a computer-processing routine which may be utilized to derive a data base of triples from a given ordinary-language text will now be discussed in conjunction with FIGS. 21, 22 and 23. The sequencing begins with an unprocessed textual file 2110 being inputted by means of editor terminal 2100. The "raw" text is then subjected to a preliminary word processing stage 2120 which structures and paginates the file. The structuring may typically take the form of allocating a predetermined number of text characters per line, together with a likewise-predetermined number of lines per page. The page numbers produced by the pagination become the previously-noted Attribute for the triples formed from words derived from the associated page. The output of the structuring and pagination process is the EDITED TEXT shown at data-storage stage 2130.

The EDITED TEXT file is next subjected to the indicated parser operation 2150. Here elementary words which commonly convey low amounts of information are deleted from the subject file. The words to be deleted are also supplied by way of terminal 2100 and are contained in the indicated DELETION LIST 2160. This list encompasses articles such as "the," "a," and "an," as well as those verbs, prepositions and conjunctions which are of a common and elementary nature. The EXCISED TEXT file 2170 is the output of the parser operation.

It may be noted parenthetically that the employment of the above-described DELETION LIST file is a common procedure whose basic nature is described by J. L. Carney in the paper entitled "Free-Text Experiment-Technical Report File," October 1981, Reference No. AD-A105449, Defense Technical Information Center, Alexandria, Virginia.

Presented in FIG. 22 are optional routines which may be utilized to further reduce the data base in accordance with various statistical considerations. A statistical analysis of the now-excised text begins at stage 2210. A first output from this analysis is the COUNTFILE 2220 in which all words of the reduced text are ordered according to their frequency of occurrence. A second output is the alphabetical file 2235 in which the subject words are accompanied by the number of times of their excised-text occurrence. At stage 2225 a tabulation is made of the total number of text words which appear any given number of times. For example, 22 of the words may have appeared five times each while ten of the words appeared six times each. This tabulation is preserved in TALLY file 2230.

The DELETION WORDS file 2240 may be generated automatically through an appropriate joint analysis of the COUNTFILE 2220 and ALPHAFILE 2235. The automatic processing may be on the basis of eliminating those words which appear too often, those which appear too infrequently, or those which occur a number of times in a designated interval. The target words in the resulting file are then cancelled out of the previously-excised text by means of DELETE1 stage 2250. Deletions may also be effectuated by means of DELETE2 stage 2270. The items deleted here are those entered through editor terminal 2100. The desired deletions in this case are typically those derived from a visual analysis of the various outputs thus far generated. The net result of the combined deletion operation appears as the indicated NEWFILE 2280.

This finally-reduced NEWFILE, or alternatively the EXCISED TEXT, is now utilized at stage 2310 in FIG. 23 to generate the triples themselves. It may be noted preliminarily that the triples generation to be described here is based upon the assumption that text words disposed in positional proximity will be conceptually related. The triples construction will thus generally entail the pairing of neighboring words. More-specifically, the construction is performed by means of textual selections carried out in accordance with three adjustable positional parameters. These parameters encompass inter-word skipping, inter-triple overlap and Attribute nature.

Inter-word skipping concerns the extent of the textual separation to be required between two words before they may be selected as the Object and Value of a given triple. Overlap entails the issue of whether a given textual word may be utilized in two distinct triples. It may be noted that this issue is alternatively regardable as a determination of whether triple-to-triple chaining will be allowed.

The final parameter concerns the specific quantity which is to be employed as the Attribute itself. For any given pair of text words respectively serving as the Object and Value of a given triple, the positional quantities available for relational attribution are the associated line number, sentence number, paragraph number and page number.

Once triples generator 2310 is supplied with desired stipulations as to the subject parameters, generation of a TRIPLES DATA data base occurs.

It will be apparent that decisions as to parameter selection will be largely dependent upon the specific nature of the given operational situation. It will be further apparent that triples generation may be effectuated in accordance with other criteria besides positional proximity. Hence some type of formal linguistic analysis may accordingly be incorporated into the generation process. It may be observed, however, that the described, positionally-referenced technique has the advantage of being relatively straight-forward in both implementation and execution.

B. Retrieval Sequence

1. Query

An information query for the subject example system will typically take the form of a data triple having no Attribute. The Attribute may be dispensed with because of the following considerations: For ordinary data triples in the example system, the Attribute will normally be indicative of positional proximity between the associated Object and Value. Because the query is an artificial construct whose Object and Value typically possess no positional frame of reference of their own, there will be no positional-indication function for the Attribute to perform. Furthermore, the Attribute is not a factor in the combinatorial comparisons performed between memories. Its presence would thus be an operational irrelevancy in the principal interactions between the various associated elements.

In order to increase the likelihood of associational matching during the memory sequencing, it often proves advantageous to inject a plurality of identical queries into the consciousness loop. Thus, for example, it would not be unusual for 50 triples, all identical, to be applied to the upper loop at one time.

An improvement in match probabilities is also the motivating rationale for preferably stipulating that during the query process, the rotations of the consciousness loop are to be iterated some desired number of times. It may be noted in this regard that although it will typically be by means of only a full combinatorial sequencing, usually involving a considerable number of upper-loop and lower-loop cyclic iterations, that all designated items of one memory may theoretically be compared with the designated items of the associated paired memory, meaningful output may often be obtained with less than a full combinatorial rotation set.

2. Resultant Output

The natural tendency within the subject, inventively-configured hierarchy is for data items related to the injected queries to be drawn into the consciousness loop. In view of the more-relevant resultant accumulation in the upper loop, it is a full or at least partial accessing and display of this loop's contents which serves as a major output of the presently-considered information-retrieval system. An often-important aspect of this output is those items which are present because of secondary associations instead of having directly matched with initially-applied queries. It is these items which are often of significant value for suggesting alternative avenues of query.

IV. Exemplary Alternative Applications

The knowledge-retrieval capabilities of the present invention are not limited in applicability to simply information retrieval. Several other utilizations will now be discussed.

With regard to the semantic networks employed in the field of artificial intelligence, it may first of all be observed that the compound data items storable in associative loop arrays are readily adaptable to the retention of the component elements of the nodes of a semantic network. In contrast with the prior art where interconnections of a hardware-intensive or software-inefficient nature were required to establish the relationships between the nodes, the self-associating capability of the present invention may instead be relied upon to automatically establish the requisite relationships. This automatic-establishment capability will now be particularized to the specific contexts of several artificial-intelligence problems.

A. Testability

The present invention can be utilized to achieve a automated self-diagnostic testing capability. For example, a complex system such as a radar could be designed with a number of internal sensors for detecting abnormal operating conditions at various functional points of interest. The items of semantic knowledge accordingly stored in the associative-loop array would take the form of those combinations of sensor outputs which would be experienced upon the occurrence of diverse operational problems.

At any given time of actual radar operation, the collective ensemble of sensor outputs would form the input to the associative-loop array and thus play a role analogous to the query in an information-retrieval context. Assuming a composite array embodiment in the form of a branched hierarchy, the sensor ensemble would initiate a series of linkages which would tend to draw into the upper levels of the hierarchy those stored data items having at least one individual data element in common with a given one of the sensor outputs. In a procedure analogous to the re-query process previously described, the sensor ensemble could be reapplied to the hierarchy in its now more-learned condition of having brought into its higher levels of consciousness a relevant family of stored data items. Such reapplication would typically tend to now initiate a further sequence of associations tending in turn to draw into the uppermost regions of the memory those data items which most closely resembled the applied ensemble in its elemental entirety. The natural operation of the inventive hierarchy would tend to eventually cause that data item, and hence that system diagnostic, which exactly matched the given sensor ensemble to be drawn out of memory for either self-corrective or repair-facilitation purposes. The net result would be a significant savings in man-hour diagnostic requirements, together with a consequential lessening of the knowledgability level needed by service personnel.

2. Mapping

In a number of operational situations, there is a requirement for carefully examining voluminous amounts of sequentially-obtained photographic data for the presence or absence of various specific types of image-to-image variations. Typically, large portions of the photographed scenes may be expected to remain constant from one sequential photograph to the next. The detection of items of change, although quite critical, may be relatively infrequent.

Photographic information of this nature may, in accordance with conventional principles, be reduced to computer-storable form in which images are encoded according to various identifiable standards. In such situations, encoded reference photographs could become the basic data base of the associative-loop array. Updated photographic information would become the input to the array's higher-order levels. The self-associating capability of the memory could then be relied upon to initiate a sequence of associations which would, with high probability, ultimately result in the retrieval from memory of the appropriate reference mapping information. The inventive memory system could be utilized in conjunction with a host computer to automatically signal the presence of discrepancies of interest between the retrieved, stored reference items and the more-recently-obtained photographic evidence. The necessity for tedious and often inherently-inefficient examination of photographic mapping data by human personnel is thus obviated.

It may be noted in this context of a large-data-base operational problem that another inherent advantage of an inventively-configured branched hierarchy is its economically-realized ability to rapidly access in parallel large amounts of stored information.

X. Claims

The preceding description has presented in detail exemplary preferred ways in which the concepts of the present invention may be applied. Those skilled in the art will recognize that numerous alternatives encompassing many variations may readily be employed without departing from the spirit and scope of the invention as set forth in the appended claims, in which:

What is claimed is:

1. A method for exchanging data between first and second memories, with each memory having a plurality of individually-accessible memory portions, the method comprising the steps of:
    (A) in each of said memories, sequentially accessing each of a predetermined plurality of said memory portions, with this sequential accessing thereby establishing in each memory a presently-accessed portion and a plurality of subsequently-accessed portions;
    (B) for each accessed portion in each of the respective memories, pair-wise comparing the data-item contents of the presently-accessed portion of the first memory with the data-item contents of the presently-associated portion of the second memory; and
    (C) upon detection of a match condition between a given pair of compared data items, diagonally exchanging the data item from the presently-accessed portion of the second memory with the data item from a predetermined one of the subsequently-accessed portions in the first memory.

2. A method according to claim 1 in which:
    the first-memory's subsequently-accessed portion to which a matched, second-memory data item is diagonally exchanged is the next subsequently-accessed location, so that the next subsequently-accessed and compared data item from the first memory is the presently diagonally-exchanged item from the second memory.

3. A method according to claim 1 in which:

said sequential-accessing, together with the associated pair-wise comparing and diagonal exchanging, is performed iteratively with respect to a given predetermined plurality of respective memory portions.

4. A method according to claim 1 in which:
(A) a given presently-accessed data item from said first memory comprises an N-tuple of N data elements, and a given presently-accessed data item from said second memory comprises an R-tuple of R data elements;
(B) said comparison includes a combinatorial operation in which each of the N elements from the first data item is pair-wise compared with each of the R elements of the second data item; and
(C) a match between the members of any one of said combinatorial pairs represents a match condition between the subject accessed data items from the respective first and second memories.

5. A method according to claim 1 in which:
(A) the absence of a data item at any given one of said sequentially-accessed memory portions establishes a data-free blank condition; with said method then further including the steps of:
(B) establishing, with respect to said first memory, a first blank-count threshold comprising a predetermined quantity which is to be the desired number of said sequentially-accessed portions of said first memory which are to remain data-free;
(C) performing a continuing tabulation of a first actual blank-count comprising the number of said sequentially-accessed, first-memory portions which are in fact data-free;
(D) determining whether said first actual blank-count has fallen below said desired first blank-count threshold; and
(E) if said actual count is determined to be below said threshold, performing a first blank-acquisition sequence so as to increase said first actual blank-count.

6. A method according to claim 5 in which:
said blank-acquisition sequence is performed iteratively until said first actual blank count exceeds said first blank-count threshold by a first predetermined number.

7. A method according to claim 1 in which:
(A) the absence of a data item at any given one of said sequentially-accessed memory portions establishes a data-free blank condition; with said method then further including the steps of:
(B) establishing, with respect to said second memory, a second blank-count threshold comprising a predetermined quantity which is to be the desired number of said sequentially-accessed portions of said second memory which are to remain data-free;
(C) performing a continuing tabulation of a second actual blank-count comprising the number of said sequentially-accessed, second-memory portions which are in fact data-free; and
(D) determining whether said second actual blank-count has fallen below said desired second blank-count threshold; and
(E) if said actual count is determined to be below said threshold, performing a second blank-acquisition sequence so as to increase said second actual blank-count.

8. A method according to claim 7 in which:
said blank-acquisition sequence is performed iteratively until said second actual blank count exceeds said second blank-count threshold by a second predetermined number.

9. An associative loop memory comprising:
(A) first and second memories, with each memory having a plurality of individually-accessible memory portions;
(B) means for sequentially accessing, in each of said memories, each of a predetermined plurality of said memory portions, with a given portion upon access thereby becoming for the given memory a presently-accessed portion, and with the remaining subsequently-accessed portions of the given memory thereby becoming for that memory subsequently-accessed portions;
(C) means for pair-wise comparing the data-item contents of the respective presently-accessed portions of the two memories; and
(D) means for diagonally exchanging the data item in the presently-accessed location of the second memory with the data item in a subsequently-accessed portion of the first memory, this exchange being performed upon the occurrence of a match condition between the pair-wised compared contents of the respective presently-accessed memory portions.

10. An associative loop memory according to claim 9 in which:
the subsequently-accessed portion to which a compared data item is exchanged upon match is the next subsequently-accessed portion of the first memory.

11. An associative loop memory according to claim 9 further including:
means for causing said sequential-accessing means, together with the associated pair-wise comparison means and diagonal-exchange means, to operate iteratively with respect to a given predetermined plurality of respective memory portions.

12. An associative loop memory according to claim 9 in which:
(A) a given presently-accessed data item from said first memory comprises an N-tuple of N data elements, and a given presently-accessed data item from said second memory comprises an R-tuple of R data elements;
(B) said comparison includes a combinatorial operation in which each of the N elements from the first data item is pair-wise compared with each of the R elements of the second data item; and
(C) a match between the members of any one of said combinatorial pairs represents a match condition between the subject accessed data items from the respective first and second memories.

13. An associative loop memory according to claim 9 in which:
(A) the absence of a data item at any given one of said sequentially-accessed memory portions establishes a data-free blank condition; with said loop memory then further including:
(B) means for establishing, with respect to said first memory, a first blank-count threshold comprising a predetermined quantity which is to be the desired number of said sequentially-accessed portions of said first memory which sre to remain data-free;

(C) means, connected to said first memory, for performing a continuing tabulation of a first actual blank count comprising the number of said sequentially-accessed, first-memory portions which are in fact data-free;

(D) first thresholding means, connected to said first threshold-establishment means and first actual-blank-count means, for determining whether said first actual-blank count has fallen below said desired first blank-count threshold; and (E) first memory-clearing means, connected to both said first thresholding means and said first and second memories, and operative upon a determination that said first actual count is below said threshold, for performing a first blank-acquisition sequence so as to increase said first actual blank-count.

14. An associative loop memory according to claim 9 in which:
said first-memory-clearing means includes means for performing said blank-acquisition sequence iteratively until said first actual blank count exceeds said first blank-count threshold by a first predetermined number.

15. An associative loop memory according to claim 9 in which:
(A) the absence of a data item at any given one of said sequentially-accessed memory portions estalishes a data-free blank condition; with said loop memory then further including:

(B) means for establishing, with respect to said second memory, a second blank-count threshold comprising a predetermined quantity which is to be the desired number of said sequentially-accessed portions of said second Smemory which are to remain data-free;

(C) means, connected to said second memory, for performing a continuing tabulation of a second actual blank-count comprising the number of said sequentially-accessed, second-memory portions which are in fact data-free;

(D) second thresholding means, connected to said second threshold-establishment means and said second actual-blank-count means, for determining whether said second actual blank-count has fallen below said desired second blank-count threshold; and (E) second memory-clearing means, connected to both said second thresholding means and said second memory, and operative upon a determination that said actual count is below said threshold, for performing a second blank-acquisition sequence so as to increase said second actual blank-count.

16. An associative loop memory according to claim 15 in which:
said second memory-clearing means includes means for performing said blank-acquisition sequence iteratively until said second actual blank-count exceeds said second blank-count threshold by a second predetermined number.

17. A memory according to claim 9 in which:
(A) said associative loop memory includes a third memory, itself having a plurality of individually-accessible memory portions;

(B) said sequential-accessing means includes means for performing said sequential-accessing in said third memory with respect to each of a predetermined plurality of its memory portions; and (C) said pair-wise comparison means and said diagonal-exchange means each include means for performing said respective pair-wise comparison and diagonal-exchange operations between said first and third memories, as well as between said first and second memories.

18. A memory according to claim 17 in which:
said iterative-operation means includes means for causing said third-memory sequential accessing means, together with the associated pair-wise comparison means and diagonal-exchange means of said first and third memories, to operate iteratively with respect to a given predetermined plurality of memory portions in said respective first and third memories.

19. An associative loop memory according to claim 17 in which:
(A) the absence of a data item at any given one of said sequentially-accessed memory portions establishes a data-free blank condition; with said loop memory then further including:

(B) means for establishing, with respect to said first, second and third memories, respective first, second and third blank-count thresholds comprising respective predetermined quantities, each of which is to be the desired number of said sequentially-accessed portion of the respective first, second and third memories which are to remain data-free;

(C) means, connected to said first, second and third memories, for performing respective continuing tabulations of first, second and third actual blank-counts comprising the respective number of said sequentially-accessed, first, second and third-memory portions which are in fact data-free;

(D) thresholding means, connected to said threshold-establishment means and said actual-blank-count means, for determining whether any of said respective actual blank-counts has fallen below said desired respective first, second and third blank-count thresholds; and (E) memory-clearing means, connected to both said thresholding means and said first, second and third memories and operative upon a determination that any one of said actual counts is below the associated threshold, for separately performing respective first, second and third blank-acquisition sequences so as to increase whichever of said actual blank-counts is deficient.

20. An associative loop memory according to claim 19 in which:
said memory-clearing means includes means for performing said respective blank-acquisition sequences iteratively until the deficient actual blank-count exceeds the associated blank-count threshold by an associated predetermined number.

21. A memory according to claim 17 in which:
(A) said first, second and third memories, together with the associated accessing, comparison and exchange means, together comprise a triangulated cluster;

(B) said associative-loop memory includes a plurality of branched, hierarchically-arranged triangulated clusters, with the hierarchy containing a predetermined plurality of highest-order through lowest-order levels, and with the second and third memories of any given cluster at any given non-lowestorder level of the hierarchy each becoming first memories with respect to in-turn triangulated memories at the given next-lower level of the hierarchy; and (C) said sequential-accessing means, said pair-wise comparison means, said diagonal-exchange means and said iterative-operation means each include means for performing their respective associated functions with respect to each first and second and each first and third triangulated-memory-pairing in said hierarchy.

22. An associative loop memory comprising:
(A) a plurality of paired memory clusters, with each paired cluster having a first and second memory, and with each of these memories having individually-accessible memory portions;
(B) a plurality of triangulated memory clusters, with each triangulated cluster having a first, second and third memory, and with each of these memories having individually-accessible memory portions;
(C) the totality of said paired and triangulated clusters being configured as an interconnected array having an associated plurality of levels in which:
  (1) one of the first memories in said cluster totality is a highest-order memory; and
  (2) the remaining memories in said array are successively-less operatively proximate to said highest-order memory and respectively are successively-lower-order memories, with those memories least operatively proximate to said highest-order memory being lowest-order memories;
(D) means for sequentially accessing, in each of said memories, each of a predetermined plurality of memory portions, with a given portion upon access thereby becoming for the given memory a presently-accessed portion and with the remaining, subsequently-accessed portions of a given memory thereby becoming subsequently-accessed portions for that memory;
(E) means for pair-wise comparing the dataitem contents of the presently-accessed portions of:
  (1) the respective first and second memories in each paired cluster at each level of the array, and of
  (2) the respective first and second and first and third memories in each triangulated cluster at each level of the array;
(F) means, operating upon the occurrence of a match condition between any two pair-wise compared data items, for diagonally exchanging the data item in the presently-accessed portion of the associated lower-order memory with the data item in a predetermined one of the subsequently-accessed portions of the associated higher-order memory.

23. An associative loop memory according to claim 22 in which:
said interconnected array of paired and triangulated memory clusters comprises a diamond-shaped lattice.

24. A knowledge-retrieval system comprising:
(A) a plurality of triangulated memory clusters,
  (1) each cluster having a first, second and third memory, with each memory having individually-accessible memory portions;
  (2) said plurality of triangulated clusters being configured as a branched hierarchy having an associated plurality of levels which include a highest-order level and a lowest-order level, with the highest level having only a first memory of an associated single triangulated cluster, and with each of the second and third memories of each of the clusters at a given non-lowest-order level individually becoming first memories with respect to in-turn triangulated memories at the next lower level of the hierarchy;
(B) means for sequentially accessing, in each of said memories, each of a predetermined plurality of memory portions, with a given portion upon acess thereby becoming for that memory a presently-accessed portion and with the remaining subsequently-accessed portions of a given memory thereby becoming subsequently-accessed portions for that memory;
(C) means for pair-wise compariang the data-item contents of the presently-accessed portions of the respective first and second and first and third memories in each triangulated cluster at each level of the hierarchy;
(D) means, operating upon the occurrence of a match condition between any two pair-wise compared data items, for diagonally exchanging the data item in the presently-accessed portion of the associated lower-order memory with the data item in the next-subsequently-accessed location of the associated higher-order memory;
(E) means for causing said sequential-accessing means, together with the associated pair-wise comparison means and diagonal-exchange means, to operate iteratively with respect to a given predetermined plurality of memory portions in each memory in each of the triangulated clusters of the hierarchy;
(F) with the absence of a data item at any given one of said sequentially-accessed memory portions establishing a data-free blank condition, means for establishing, with respect to each of said first, second and third memories in each of said triangulated clusters, respective first, second and third blank-count thresholds comprising respectively predetermined quantities, each of which is to be the desired number of said sequentially-accessed portions of the respective first, second and third memories which are to remain data-free;
(G) means, connected to each of said first, second and third memories in each of said triangulated clusters, for performing respective continuing tabulations of first, second and third actual blank-counts comprising the respective number of each of said sequentially-accessed first, second and third-memory portions which are in fact data-free;
(H) thresholding means, connected to said threshold-establishment means and said actual-blank-count means, for determining whether any of said respective actual blank-counts has fallen below said desired respective first, second and third blank-count thresholds; and
(I) memory-clearing means, connected to both said thresholding means and each of said first, second and third memories and operative upon a determination that any one of said actual counts is below the associated threshold, for separately performing respective first, second and third blank-acquisition sequences so as to increase whichever of said actual blank-counts is deficient, with said respective blank-acquisition sequences being performed iteratively until each given deficient actual blank-count exceeds the associated threshold by an associated predetermined number.

25. A system according to claim 24 in which:
(A) a given presently-accessed data item from a given one of said first memories comprises an N-tuple of N data elements, and a given presently-accessed data item from a given one of said cluster-associated second and third memories comprises an R-tuple of R data elements;
(B) said comparison includes a combinatorial operation in which each of the N elements from the first data item is pair-wise compared with each of the R elements of the associated lower-order data item;
(C) a match between the members of any one of said combinatorial pairs represents a match condition between the subject accessed data items from the respective first and associated lower-order memories.

* * * * *